US012615644B2

(12) United States Patent
Lin

(10) Patent No.: US 12,615,644 B2
(45) Date of Patent: Apr. 28, 2026

(54) PHYSICAL DOWNLINK CONTROL CHANNEL MONITORING FOR SMALL DATA TRANSMISSION

(71) Applicant: Telefonaktiebolaget LM Ericsson (publ), Stockholm (SE)

(72) Inventor: Zhipeng Lin, Nanjing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 259 days.

(21) Appl. No.: 18/271,786

(22) PCT Filed: Jan. 13, 2022

(86) PCT No.: PCT/CN2022/071707
§ 371 (c)(1),
(2) Date: Jul. 11, 2023

(87) PCT Pub. No.: WO2022/152189
PCT Pub. Date: Jul. 21, 2022

(65) Prior Publication Data
US 2025/0287385 A1      Sep. 11, 2025

(30) Foreign Application Priority Data
Jan. 13, 2021    (WO) ................ PCT/CN2021/071441

(51) Int. Cl.
*H04W 72/23*        (2023.01)
*H04W 74/0833*      (2024.01)
*H04W 76/27*        (2018.01)

(52) U.S. Cl.
CPC ....... *H04W 72/23* (2023.01); *H04W 74/0833* (2013.01); *H04W 76/27* (2018.02)

(58) Field of Classification Search
CPC .. H04W 72/23; H04W 74/0833; H04W 76/27
See application file for complete search history.

(56) References Cited

U.S. PATENT DOCUMENTS

| | | | |
|---|---|---|---|
| 2020/0196349 A1* | 6/2020 | He | H04W 72/1268 |
| 2021/0243777 A1* | 8/2021 | Tsai | H04W 74/006 |

(Continued)

FOREIGN PATENT DOCUMENTS

WO      2019217829 A1    11/2019

OTHER PUBLICATIONS

Samsung, "Configured Grant based Small Data Transmission", 3GPP TSG-RAN2 Meeting #112 Electronic, Nov. 2-13, 2020, pp. 1-8, R2-2009094, 3GPP.

(Continued)

*Primary Examiner* — Dady Chery
(74) *Attorney, Agent, or Firm* — COATS & BENNETT, PLLC

(57) ABSTRACT

The present disclosure proposes a user equipment (UE) and method for monitoring physical downlink control channel (PDCCH) for small data transmission (SDT) and a network node and method for configuring a UE with downlink (DL) radio resource for PDCCH for SDT. The method at the UE for monitoring PDCCH in downlink (DL) radio resource for SDT in a non-connected state comprises: receiving, from a network node serving the UE, a message indicating the DL radio resource to be monitored by the UE for SDT; and monitoring one or more PDCCHs in the indicated DL radio resource for SDT in the non-connected state.

20 Claims, 10 Drawing Sheets

(56)  References Cited

U.S. PATENT DOCUMENTS

| | | | | |
|---|---|---|---|---|
| 2022/0022247 A1* | 1/2022 | Agiwal | ............. | H04W 72/0453 |
| 2022/0210798 A1* | 6/2022 | Tsai | .................. | H04W 72/1263 |
| 2022/0295540 A1* | 9/2022 | Tsai | .................. | H04W 72/1273 |

OTHER PUBLICATIONS

Vutukuri, E., "LS on physical layer aspects of small data transmission", 3GPP TSG-RAN WG2 Meeting #112e, eMeeting, Nov. 2-13, 2020, pp. 1-2, R2-2010841, 3GPP.

* cited by examiner 4-step RACH-based SDT 2-step RACH-based SDT

Configured Grant-based SDT

500

<u>600</u>

S610 a message indicating the DL radio resource to be monitored by the UE for SDT is transmitted to the UE

S620 one or more PDCCHs for SDT are transmitted to the UE in the indicated DL radio resource <u>700</u>

INPUT
<u>702</u>

OUTPUT
<u>704</u>

PROCESSING UNIT
<u>706</u>

<u>710</u>

COMPUTER PROGRAM PRODUCT
<u>708</u>

<u>710A</u>

<u>710B</u>

<u>710C</u>

<u>710D</u>

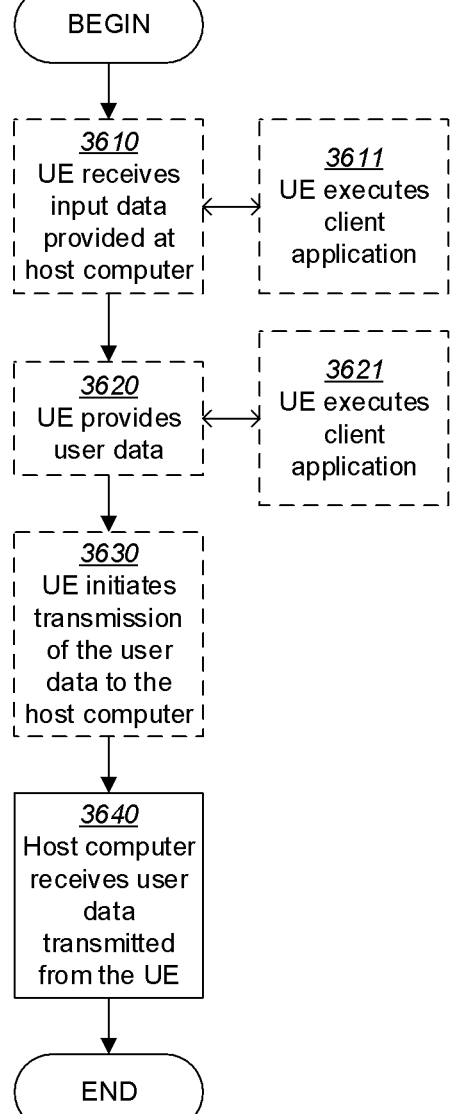
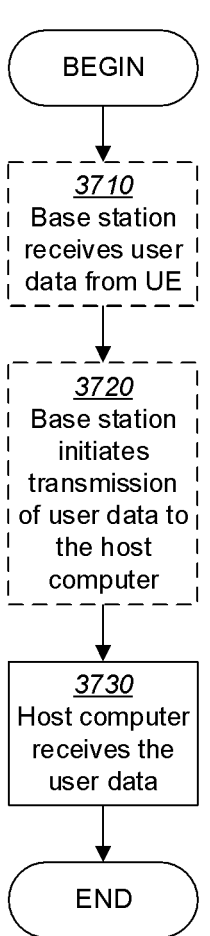
FIG. 14
FIG. 15

PHYSICAL DOWNLINK CONTROL CHANNEL MONITORING FOR SMALL DATA TRANSMISSION

TECHNICAL FIELD

The present disclosure is related to the field of telecommunication, and in particular, to a user equipment (UE) and method for monitoring physical downlink control channel (PDCCH) for small data transmission (SDT) and a network node and method for configuring a UE with downlink (DL) radio resource for PDCCH for SDT.

BACKGROUND

With the development of the electronic and telecommunications technologies, mobile devices, such as a mobile phone, a smart phone, a laptop, a tablet, a vehicle mounted device, an Internet of Things (IoT) device (such as, a sensor), becomes an important part of our daily lives. To support a numerous number of mobile devices, a highly efficient Radio Access Network (RAN), such as a fifth generation (5G) New Radio (NR) RAN, is proposed.

5G NR RAN needs to support services that typically require only infrequent small data traffic. Examples of such services may include traffic from instant messaging (IM) services like WhatsApp and WeChat, heart-beat traffic from IM/email clients and other apps, push notifications from various apps, industrial wireless sensors transmitting temperature, pressure data periodically, etc.

Further, 5G NR RAN supports the RRC_INACTIVE state, and UEs with infrequent (periodic and/or non-periodic) data transmission are generally maintained by the network in the RRC_CONNECTED state. Until NR Rel-16, the RRC_INACTIVE state does not support data transmission. Hence, the UE has to resume the connection (i.e., move to the RRC_CONNECTED state) for any DL and uplink (UL) data. A connection setup and a subsequent release to the RRC_INACTIVE state has to happen for each data transmission regardless of how small and infrequent the data packets are. This results in unnecessary power consumption and signaling overhead. The signaling overhead for setting up connections before each transmission can sometimes be even greater than the size of the actual data payload. To reduce the signaling overhead and improve UE battery life, in NR Rel-17, a work item on NR small data transmission (SDT) in RRC_INACTIVE state is ongoing.

SUMMARY

According to a first aspect of the present disclosure, a method at a user equipment (UE) for monitoring Physical Downlink Control Channel (PDCCH) in downlink (DL) radio resource for small data transmission (SDT) in a non-connected state is provided. The method comprises: receiving, from a network node serving the UE, a message indicating the DL radio resource to be monitored by the UE for SDT; and monitoring one or more PDCCHs in the indicated DL radio resource for SDT in the non-connected state.

In some embodiments, the non-connected state is the RRC_INACTIVE state. In some embodiments, the DL radio resource is indicated in the message by a control resource set (CORESET) field or a CORESET ID field, a search space (SS) field or an SS ID field, or a combination thereof. In some embodiments, the message is a system information message or a UE specific RRC message. In some embodiments, the system information message is an RRC System Information Block 1 (SIB1) message or an RRC System Information (SI) message.

In some embodiments, the DL radio resource is indicated in the message by a Type1 common SS field. In some embodiments, the step of monitoring one or more PDCCHs in the indicated DL radio resource for SDT in the non-connected state comprises one or more of: monitoring, in the indicated DL radio resource, a PDCCH which schedules a Physical Downlink Share Channel (PDSCH) for a random access response (RAR) in a 4-step random-access-channel (RACH)-based SDT; monitoring, in the indicated DL radio resource, a PDCCH which schedules a PDSCH for a MsgB in a 2-step RACH-based SDT; monitoring, in the indicated DL radio resource, a PDCCH with a cyclic redundancy check (CRC) scrambled by a cell-radio network temporary identifier (C-RNTI) assigned to the UE; and monitoring, in the indicated DL radio resource, a PDDCH which schedules a PDSCH for a configured-grant (CG)-based SDT. In some embodiments, the DL radio resource is indicated in the message by a Type3 common SS field. In some embodiments, the DL radio resource is indicated in the UE specific RRC message by a UE specific SS field. In some embodiments, after the step of receiving, from a network node serving the UE, a message indicating the DL radio resource to be monitored by the UE for SDT and before the step of monitoring one or more PDCCHs in the indicated DL radio resource for SDT in the non-connected state, the method further comprises: transitioning from the RRC_CONNECTED state to the RRC_INACTIVE state. In some embodiments, the DL radio resource is indicated in the message by a Type0 common SS field, a Type0A common SS field, and/or a Type2 common SS field. In some embodiments, in a case where multiple SSs are configured at the UE, the method further comprises: determining one from the multiple SSs according to a predetermined rule, wherein the step of monitoring one or more PDCCHs in the indicated DL radio resource for SDT in the non-connected state comprises: monitoring one or more PDCCHs in the DL radio resource corresponding to the determined SS.

In some embodiments, in a case where multiple SSs are configured, the method further comprises: receiving a second message comprising at least one SS ID field identifying at least one of the multiple SSs to be used for SDT monitoring, wherein the step of monitoring one or more PDCCHs in the indicated DL radio resource for SDT in the non-connected state comprises: monitoring one or more PDCCHs in the DL radio resource corresponding to the identified SS. In some embodiments, the second message is one of: a dedicated RRC message; a medium access control (MAC) protocol data unit (PDU); a Msg4 in a RACH procedure; and a downlink control information (DCI) message. In some embodiments, the DCI message is used for scheduling a downlink transmission for which the SS is known. In some embodiments, the UE specific RRC message is an RRC release message which triggers the UE to transition into the RRC_INACTIVE state. In some embodiments, the message comprises an SS field dedicated for SDT. In some embodiments, the number of DL radio resources assigned for SDT in a period of time is determined at least based on latency requirement and/or power consumption requirement for the SDT. In some embodiments, the SS field dedicated for SDT indicates additional DL radio resource for SDT, which is used together with the DL radio resource indicated by the Type0 common SS field for SDT.

In some embodiments, in a case where more than one monitoring occasion per slot is indicated by the message, before the step of monitoring one or more PDDCHs in the indicated DL radio resource for SDT in the non-connected state, the method further comprises: determining one of the monitoring occasions per slot to be monitored, and where the step of monitoring one or more PDCCHs in the indicated DL radio resource for SDT in the non-connected state comprises: monitoring one or more PDCCHs in the determined monitoring occasion for SDT. In some embodiments, the step of determining one of the monitoring occasions per slot to be monitored comprises one of: receiving, from the network node, an RRC message indicating the monitoring occasion per slot to be monitored; determining the monitoring occasion per slot to be monitored according to a pre-determined rule; and determining the monitoring occasion per slot to be monitored at least based on a corresponding CORESET configuration, a corresponding physical random access channel (PRACH) preamble configuration for SDT, a corresponding CG configuration for SDT, and/or a corresponding system frame number.

In some embodiments, the CORESET field indicates DL radio resource corresponding to CORESET0. In some embodiments, the message comprises a CORESET field dedicated for SDT. In some embodiments, the RRC release message indicates a UE specific CORESET. In some embodiments, in a case where multiple CORESETs are configured at the UE, the method further comprises: receiving, from the network node, a third message comprising at least one CORESET ID field identifying at least one of the multiple CORESETs to be used for SDT monitoring, wherein the step of monitoring one or more PDCCHs in the indicated DL radio resource for SDT in the non-connected state comprises: monitoring one or more PDCCHs in the DL radio resource corresponding to the identified CORESET. In some embodiments, the third message is one of: a dedicated RRC message; a medium access control (MAC) protocol data unit (PDU); a Msg4 in a RACH procedure; a downlink control information (DCI) message. In some embodiments, the DCI message is used for scheduling a downlink transmission for which the CORESET is known.

According to a second aspect of the present disclosure, a user equipment (UE) is provided. The UE comprises: a processor; a memory storing instructions which, when executed by the processor, cause the processor to perform any of the methods of the first aspect.

According to a third aspect of the present disclosure, a method at a network node for configuring a user equipment (UE) with downlink (DL) radio resource for Physical Downlink Control Channel (PDCCH) for small data transmission (SDT) in a non-connected state is provided. The method comprises: transmitting, to the UE, a message indicating the DL radio resource to be monitored by the UE for SDT; and transmitting, to the UE, one or more PDCCHs for SDT in the indicated DL radio resource.

In some embodiments, the non-connected state is the RRC_INACTIVE state for the UE. In some embodiments, the DL radio resource is indicated in the message by a control resource set (CORESET) field or a CORESET ID field, a search space (SS) field or an SS ID field, or a combination thereof. In some embodiments, the message is a system information message or a UE specific RRC message. In some embodiments, the system information message is an RRC System Information Block 1 (SIB1) message or an RRC System Information (SI) message.

In some embodiments, the DL radio resource is indicated in the message by a Type1 common SS field. In some embodiments, the step of transmitting, to the UE, one or more PDCCHs for SDT in the indicated DL radio resource comprises one or more of: transmitting, in the indicated DL radio resource, a PDCCH which schedules a Physical Downlink Share Channel (PDSCH) for a random access response (RAR) in a 4-step random-access-channel (RACH)-based SDT; transmitting, in the indicated DL radio resource, a PDCCH which schedules a PDSCH for a MsgB in a 2-step RACH-based SDT; transmitting, in the indicated DL radio resource, a PDCCH with a cyclic redundancy check (CRC) scrambled by a cell-radio network temporary identifier (C-RNTI) assigned to the UE; and transmitting, in the indicated DL radio resource, a PDDCH which schedules a PDSCH for a configured-grant (CG)-based SDT. In some embodiments, the DL radio resource is indicated in the message by a Type3 common SS field. In some embodiments, the DL radio resource is indicated in the UE specific RRC message by a UE specific SS field. In some embodiments, the DL radio resource is indicated in the message by a Type0 common SS field, a Type0A common SS field, and/or a Type2 common SS field.

In some embodiments, in a case where multiple SSs are configured at the UE, the method further comprises: determining one from the multiple SSs according to a predetermined rule, wherein the step of transmitting, to the UE, one or more PDCCHs for SDT in the indicated DL radio resource comprises: transmitting, to the UE, one or more PDCCHs for SDT in the DL radio resource corresponding to the determined SS. In some embodiments, in a case where multiple SSs are configured at the UE, the method further comprises: transmitting a second message comprising at least one SS ID field identifying at least one of the multiple SSs to be used for SDT monitoring, wherein the step of transmitting, to the UE, one or more PDCCHs for SDT in the indicated DL radio resource comprises: transmitting, to the UE, one or more PDCCHs for SDT in the DL radio resource corresponding to the identified SS. In some embodiments, the second message is one of: a dedicated RRC message; a medium access control (MAC) protocol data unit (PDU); a Msg4 in a RACH procedure; a downlink control information (DCI) message.

In some embodiments, the DCI message is used for scheduling a downlink transmission for which the SS is known. In some embodiments, the UE specific RRC message is an RRC release message which triggers the UE to transition into the RRC_INACTIVE state. In some embodiments, the message comprises an SS field dedicated for SDT. In some embodiments, the number of DL radio resources assigned for SDT in a period of time is determined at least based on latency requirement and/or power consumption requirement for the SDT. In some embodiments, the SS field dedicated for SDT indicates additional DL radio resource for SDT, which is used together with the DL radio resource indicated by the Type0 common SS field for SDT. In some embodiments, in a case where more than one monitoring occasion per slot is indicated by the message, before the step of transmitting, to the UE, one or more PDCCHs for SDT in the indicated DL radio resource, the method further comprises: determining one of the monitoring occasions per slot to be transmitted, and where the step of transmitting, to the UE, one or more PDCCHs for SDT in the indicated DL radio resource comprises: transmitting, to the UE, one or more PDCCHs for SDT in the determined monitoring occasion per slot. In some embodiments, the step of determining one of the monitoring occasions per slot to be monitored comprises one of: determining the monitoring occasion per slot to be monitored according to a pre-agreed rule; and determining the monitoring occasion per slot to be monitored at least based on a corresponding CORESET configuration, a corresponding physical random access channel (PRACH) preamble configuration for SDT, a corresponding CG configuration for SDT, and/or a corresponding system frame number.

In some embodiments, the CORESET field indicates DL radio resource corresponding to CORESET0. In some embodiments, the message comprises a CORESET field dedicated for SDT. In some embodiments, the RRC release message indicates a UE specific CORESET. In some embodiments, in a case where multiple CORESETs are configured at the UE, the method further comprises: transmitting, to the UE, a third message comprising at least one CORESET ID field identifying at least one of the multiple CORESETs to be used for SDT monitoring, wherein the step of transmitting, to the UE, one or more PDCCHs for SDT in the indicated DL radio resource comprises: transmitting the one or more PDCCHs for SDT in the DL radio resource corresponding to the identified CORESET.

In some embodiments, the third message is one of: a dedicated RRC message; a medium access control (MAC) protocol data unit (PDU); a Msg4 in a RACH procedure; a downlink control information (DCI) message. In some embodiments, the DCI message is used for scheduling a downlink transmission for which the CORESET is known.

According to a fourth aspect of the present disclosure, a network node is provided. The network node comprises: a processor; a memory storing instructions which, when executed by the processor, cause the processor to perform any of the methods of the third aspect.

According to a fifth aspect of the present disclosure, a user equipment (UE) for monitoring Physical Downlink Control Channel (PDCCH) in downlink (DL) radio resource for small data transmission (SDT) in a non-connected state is provided. The UE comprises: a receiving module configured to receive, from a network node serving the UE, a message indicating the DL radio resource to be monitored by the UE for SDT; and a monitoring module configured to monitor one or more PDCCHs in the indicated DL radio resource for SDT in the non-connected state.

According to a sixth aspect of the present disclosure, a network node for configuring a user equipment (UE) with downlink (DL) radio resource for Physical Downlink Control Channel (PDCCH) for small data transmission (SDT) in a non-connected state is provided. The network node comprises: a first transmitting module configured to transmit, to the UE, a message indicating the DL radio resource to be monitored by the UE for SDT; and a second transmitting module configured to transmit, to the UE, one or more PDCCHs for SDT in the indicated DL radio resource.

According to a seventh aspect of the present disclosure, a computer program comprising instructions is provided. The instructions, when executed by at least one processor, cause the at least one processor to carry out any of the methods of the first aspect and/or the third aspect.

According to an eighth aspect of the present disclosure, a carrier containing the computer program of the seventh aspect is provided. The carrier is one of an electronic signal, optical signal, radio signal, or computer readable storage medium.

According to a ninth aspect of the present disclosure, a telecommunications system is provided. The telecommunications system comprises one or more UEs of the second aspect; and at least one network node of the fourth aspect.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

FIG. 12 to FIG. 15 are flowcharts illustrating methods implemented in a communication system including a host computer, a base station and a user equipment according to an embodiment of the present disclosure.

DETAILED DESCRIPTION

Figure 1:
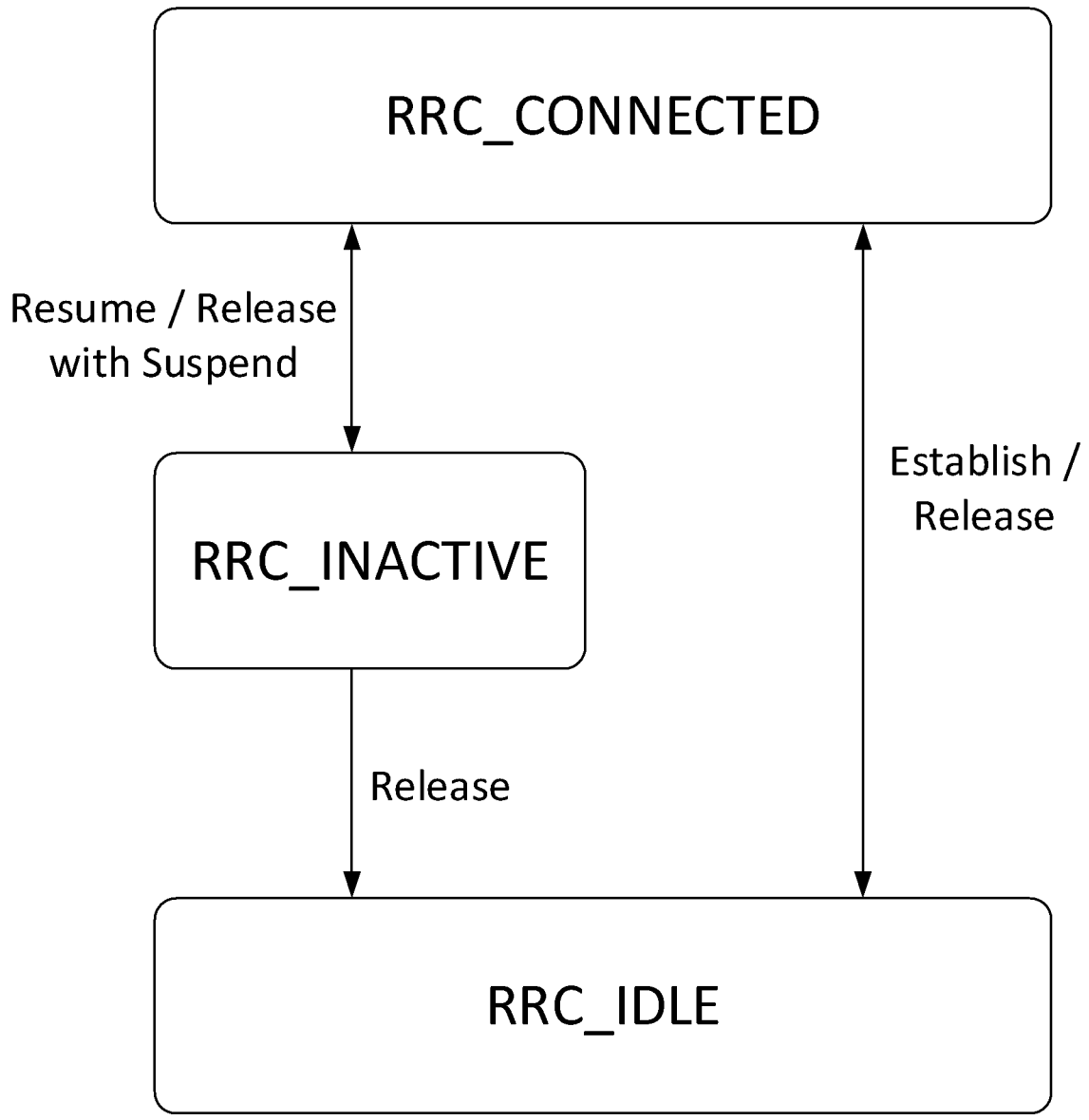
FIG. 1 is an overview diagram illustrating an exemplary UE RRC state machine and state transitions with which a UE according to an embodiment of the present disclosure is operable.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of 5G New Radio (NR), the present disclosure is not limited thereto. In fact, as long as small data transmission is involved, the inventive concept of the present disclosure may be applicable to any appropriate communication architecture, for example, to Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5th Generation New Radio (5G NR), etc. Therefore, one skilled in the arts could readily understand that the terms used herein may also refer to their equivalents in any other infrastructure. For example, the term "User Equipment" or "UE" used herein may refer to a terminal device, a mobile device, a mobile terminal, a mobile station, a user device, a user terminal, a wireless device, a wireless terminal, or any other equivalents. For another example, the term "gNB" used herein may refer to a network node, a base station, a base transceiver station, an access point, a hot spot, a NodeB, an Evolved NodeB, a network element, or any other equivalents. Further, please note that the term "field" used herein may refer to an attribute, a setting, a configuration, a profile, an identifier, an indicator, one or more bits/octets, or any data by which information of interest may be indicated directly or indirectly.

Further, following 3GPP documents are incorporated herein by reference in their entireties:

3GPP TS 38.321 V16.2.1 (2020-09), 3rd Generation Partnership Project; Technical Specification Group Radio Access Network; NR; Medium Access Control (MAC) protocol specification (Release 16); and 3GPP TS 38.331 V16.2.0 (2020-09), 3rd Generation Partnership Project; Technical Specification Group Radio Access Network; NR; Radio Resource Control (RRC) protocol specification (Release 16).

FIG. 1 is an overview diagram illustrating an exemplary UE RRC state machine and state transitions with which a UE according to an embodiment of the present disclosure is operable. As shown in FIG. 1, a UE is either in the RRC_CONNECTED state or in the RRC_INACTIVE state when an RRC connection has been established. If this is not the case, i.e., no RRC connection is established, the UE is in the RRC_IDLE state. The RRC states can further be characterized as follows:

RRC Idle:

A UE specific discontinuous reception (DRX) may be configured by upper layers;

UE controlled mobility based on network configuration;

The UE may:

monitor Short Messages transmitted with Paging-Radio Network Temporary Identifier (P-RNTI) over DCI;

monitor a Paging channel for Core Network (CN) paging using 5G-Serving-Temporary Mobile Subscriber Identity (5G-S-TMSI);

perform neighboring cell measurements and cell (re-) selection;

acquire system information and can send system information (SI) request (if configured).

perform logging of available measurements together with location and time for logged measurement configured UEs.

RRC Inactive:

A UE specific DRX may be configured by upper layers or by RRC layer;

UE controlled mobility based on network configuration;

The UE stores the UE Inactive Access Stratum (AS) context;

A RAN-based notification area is configured by RRC layer;

The UE may:

monitor Short Messages transmitted with P-RNTI over DCI;

monitor a Paging channel for CN paging using 5G-S-TMSI and RAN paging using full-RNTI;

perform neighboring cell measurements and cell (re-) selection;

perform RAN-based notification area updates periodically and when moving outside the configured RAN-based notification area;

acquire system information and can send SI request (if configured).

perform logging of available measurements together with location and time for logged measurement configured UEs.

RRC Connected:

The UE stores the AS context;

Transfer of unicast data to/from UE;

At lower layers, the UE may be configured with a UE specific DRX;

For UEs supporting carrier aggregation (CA), use of one or more secondary cells (SCells), aggregated with the special cell (SpCell), for increased bandwidth;

For UEs supporting dual connectivity (DC), use of one secondary cell group (SCG), aggregated with the master cell group (MCG), for increased bandwidth;

Network controlled mobility within NR and to/from Evolved Universal Terrestrial Radio Access (E-UTRA);

The UE may:

monitor Short Messages transmitted with P-RNTI over DCI, if configured;

monitor control channels associated with the shared data channel to determine if data is scheduled for it;

provide channel quality and feedback information;

perform neighboring cell measurements and measurement reporting;

acquire system information;

perform immediate minimization of drive tests (MDT) measurement together with available location reporting.

From above, unlike LTE, in NR there is an additional RRC state "RRC_INACTIVE" between the RRC_CONNECTED and RRC_IDLE and a UE can optionally stay in this RRC_INACTIVE state without completely releasing the RRC connection when there is no traffic and quickly switch back to the RRC_CONNECTED state when necessary.

As shown in FIG. 1, an RRC release message with a suspendConfig Information Element (IE) will move the UE from the RRC_CONNECTED state to the RRC_INACTIVE state, and an RRC resume message will take it back to the RRC_CONNECTED state. Similarly, an RRC release message without a suspendConfig or an abnormal failure will put the UE in the RRC_IDLE state. However, the present disclosure is not limited thereto. In some other embodiments, different conditions for the state transitions may be applicable.

Further, please note that although some embodiments of the present disclosure are described below with reference to the RRC_INACTIVE state, the present disclosure is not limited thereto. In some other embodiments, the inventive concept of the embodiments may also be applicable to SDT in another state, e.g., the RRC_IDLE state. Therefore, such states may be collectively referred to as "non-connected" states and may comprise 3GPP-compliant states and/or similar states in other access technologies, such as, Wi-Fi, Bluetooth, WiMax, etc.

Figure 2:
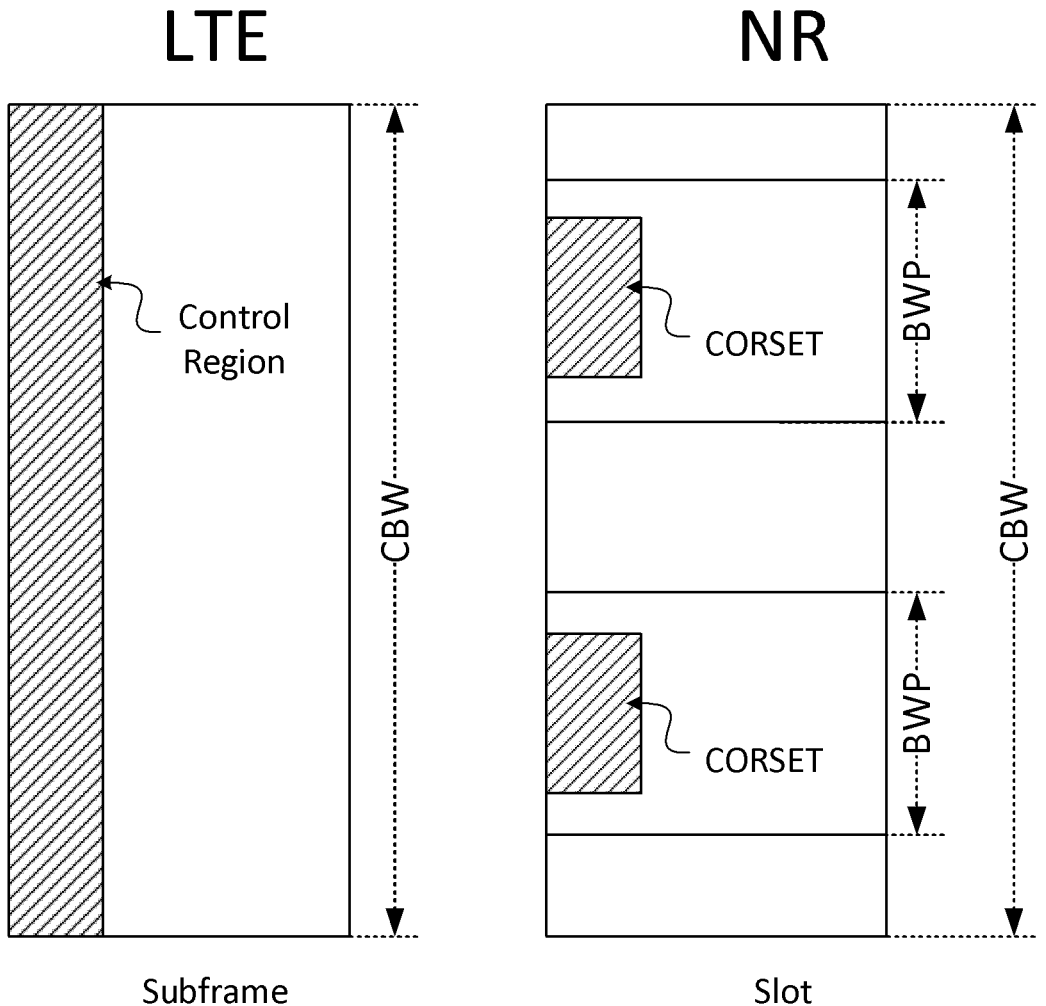
FIG. 2 is a diagram illustrating a comparison between an exemplary LTE control region and an NR control resource set (CORESET).

FIG. 2 is a diagram illustrating a comparison between an exemplary LTE control region and an exemplary NR CORESET. "CORESET" is a set of physical resources (i.e., a specific area on NR downlink resource grid) and a set of parameters that is used to carry PDCCH/DCI. It is equivalent to LTE PDCCH area (the first 1, 2, 3, 4 OFDM symbols in a subframe) to some extent. However, in an LTE PDCCH region, the PDCCH is always spread across the whole channel bandwidth as shown by the left portion of FIG. 2, while an NR CORESET region may be localized to a specific region in frequency domain as shown by the right portion of FIG. 2. For example, multiple NR CORESETs are localized within each bandwidth part (BWP) as shown in FIG. 2.

Since a control region in LTE is always spread across the whole CBW, there is no parameters defining the frequency domain region for LTE control region, but in NR a parameter defining the frequency domain width for CORESET is needed since the frequency domain width can be set in any value in the multiples of 6 RBs. Further, both NR CORESET and LTE Control Region can vary in time domain length. Therefore, the parameter for time domain length is needed both in LTE and in NR. In LTE, the time domain length of a control region is defined by the physical channel called physical control format indicator channel (PCFICH) but in NR the time domain length of CORESET is defined by the RRC parameter "ControlResourceSet.duration". A CORESET is made up of multiple resource blocks (i.e., multiples of 12 Resource Elements (REs)) in frequency domain and '1 or 2 or 3' OFDM symbols in time domain.

The CORESET described above is normal CORESET and those CORESETs are configured by RRC. However, there is a special type of CORESET called CORESET 0. This CORESET is the one transmitting PDCCH for System Information Block (SIB1) scheduling. As mentioned above, there are many parameters involved in defining those CORESETs and those parameters are specified by RRC messages. However, CORESET 0 cannot be specified by RRC since it should be used before any RRC is transmitted. It implies that CORESET 0 should be configured by some predefined process and predefined parameters.

In addition to CORESET, there is another aspect of the radio resource in NR: search space (SS). An SS is an area within a CORESET that a UE should monitor to detect a specific PDCCH/DCI. There are two large categories of Search Spaces (SSs) called CSS (Common Search Space) and USS (UE specific Search Space). Which Search Space UE has to monitor is defined by RNTI type or RRC configuration summarized in table 1 below.

TABLE 1

Types of SS

| SS Type | PDCCH Type | RRC Configuration | RNTI Type |
|---------|-----------|-------------------|-----------|
| CSS | Type0-PDCCH | pdcch-ConfigSIB1 in MIB searchSpaceSIB1 in PDCCH-ConfigCommon searchSpaceZero in PDCCH-ConfigCommon | SI-RNTI |
| | Type0A-PDCCH | searchSpaceOtherSystemInformation in PDCCH-ConfigCommon | SI-RNTI |
| | Type1-PDCCH | ra-SearchSpace in PDCCH-ConfigCommon | RA-RNTI, MsgB-RNTI, TC-RNTI |
| | Type2-PDCCH | pagingSearchSpace in PDCCH-ConfigCommon | P-RNTI |
| | Type3-PDCCH | SearchSpace in PDCCH-Config with searchSpaceType = common | INT-RNTI, SFI-RNTI, TPC-PUSCH-RNTI, TPC-PUCCH-RNTI, TPC-SRS-RNTI, CI-RNTI, C-RNTI, MCS-C-RNTI, CS-RNTI, or PS-RNTI |
| USS | | SearchSpace in PDCCH-Config with searchSpaceType = ue-Specific | C-RNTI, MCS-C-RNTI, SP-CSI-RNTI, CS-RNTI, SL-RNTI, SL-CS-RNTI, or SL-L-RNTI |

As mentioned above, a work item on NR SDT in RRC_I-NACTIVE state is ongoing. In NR Rel-17 SDT work item, two main solutions will be specified for enabling SDT in the RRC_INACTIVE state, that is, the Random Access Channel (RACH) based SDT and the Configured Grant (CG) based SDT. For example, in the RACH based SDT, the SDT may be transmitted on Message A PUSCH in a 2-step RACH procedure, or on Message 3 PUSCH in a 4-step RACH procedure. For another example, in the CG based SDT, the SDT may be transmitted over configured grant type-1 PUSCH resources. Next, exemplary SDT procedures according to some embodiments of the present disclosure will be described with reference to FIG. 3 and FIG. 4.

Figure 3:
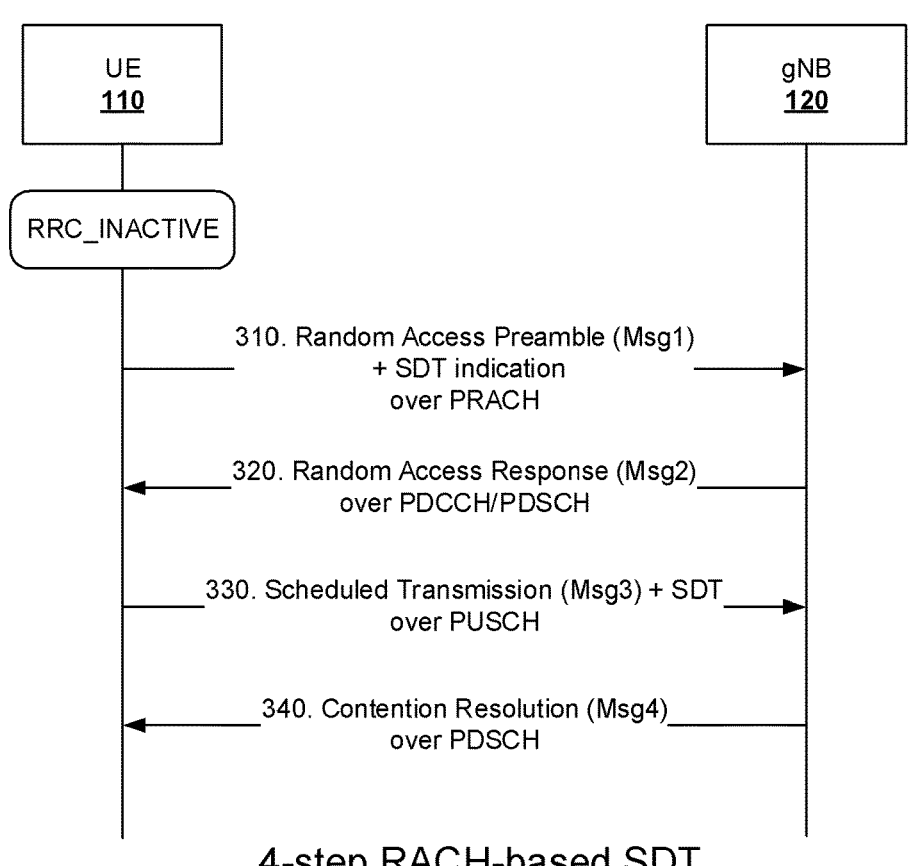
FIG. 3 is a diagram illustrating an exemplary 4-step RACH-based SDT procedure and an exemplary 2-step RACH-based SDT procedure according to an embodiment of the present disclosure.
Figure 3:
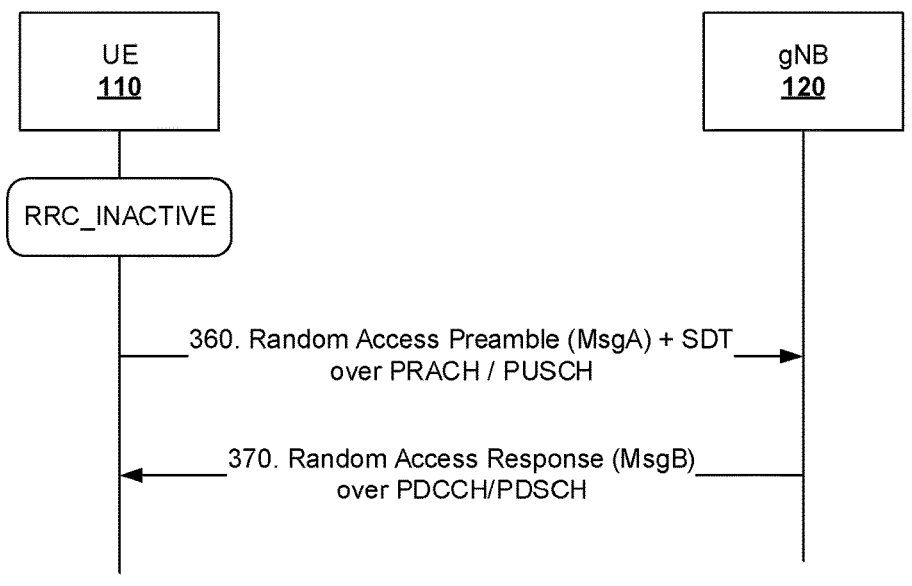

FIG. 3 is a diagram illustrating an exemplary 4-step RACH-based SDT procedure and an exemplary 2-step RACH-based SDT procedure according to an embodiment of the present disclosure.

A random access procedure is also known as an initial cell search procedure. Cell search is a procedure by which a UE 110 can synchronize with the time and frequency of a cell and scan and get the cell id of a cell. RACH stands for Random Access Channel. This is the first message from a UE 110 to a gNB 120 when the UE 110 is powered on just to get synchronized with the best listening cell. Typically, the UE 110 may apply the random access procedure by two types, that is, a contention based RACH procedure (CBRA), which is also known as 4-step RACH procedure, and a contention free RACH procedure (CFRA), which is also known as 2-step RACH procedure. The CBRA is a normal procedure, in which a UE randomly selects a preamble in Zadoff-Chu sequence and sends the RACH request towards the network. In CFRA, the network itself shares the details of cell and preamble, by using this, UE sends the RACH request towards the network, and CFRA is generally used in the handover scenario.

An exemplary 4-step RACH-based SDT is shown by the upper portion of FIG. 3. The UE 110 may stay in the RRC_INACTIVE state when the procedure is begun. The UE 310 may determine UL radio resource for RACH, for example, by monitoring system information broadcasted by the gNB 120, and then attempt random access procedure by transmitting an RACH preamble over a physical random access channel (PRACH or Msg1) on the configured RACH resource at step 310. The preamble may be referenced with the Random Access Preamble Id (RAPID). In some embodiments, the preamble transmission may be a Zadoff-Chu sequence. Further, in some embodiments, an indication for SDT may also be signaled by the UE 110 to the gNB 120 explicitly or implicitly, for example, by any explicit bit indication transmitted together with the preamble or by the selection of the preamble.

When the gNB 120 receives the PRACH transmission, it may determine, from the received SDT indication, that an SDT is requested by the UE 110, and therefore it may assign UL resources to the UE for SDT and then a Random Access Response (RAR) message is generated accordingly by the gNB 120. At step 320, the gNB 120 may respond with an RAR ("RA Response") message (Msg2) which comprises an uplink grant for the UE 110's SDT and a temporary C-RNTI (TC-RNTI) for the UE 110.

Upon reception of the RAR message, the UE 110 may try to find out a DCI Format 1_0 with CRC scrambled by the RA-RNTI corresponding to the PRACH transmission. The DCI message which is scrambled by RA-RNTI signals the frequency and time resources assigned for the transmission of the transport block containing the Random Access Response message. Therefore, the UE 110 may detect a DCI Format 1_0 with CRC scrambled by the corresponding RA-RNTI and receive a transport block in a corresponding Physical Downlink Shared Channel (PDSCH). In such a case, if the UE 110 successfully decodes the PDCCH, it may decode the PDSCH carrying the RAR data.

Upon successful decoding of the RAR data, the UE 110 may determine its UL radio resources for SDT, and transmit Msg3 (e.g., an RRCResumeRequest message) comprising the SDT and any other necessary data over the assigned radio resources together with the assigned TC-RNTI over the PUSCH to the gNB 120 after adjusting the timing of the PUSCH transmission, allowing the PUSCH to be received at the gNB 120 with a timing accuracy within the cyclic prefix. Without this timing advance functionality, a very large CP would be needed in order to be able to demodulate and detect PUSCH, unless the system is applied in a cell with very small distance between UE 110 and gNB 120. Since NR will also support larger cells, there is a need for providing a timing advance to the UE 110 and thus the 4-step approach is needed for random access procedure.

After getting the Msg3 from the UE 110, the gNB 120 may decode the Msg3 and obtain the SDT data and transmit the Msg4 to the UE 110 to resolve any potential contention and acknowledge the successful reception of the SDT. In some embodiments, the Msg4 may be an RRC Release message with a suspendConfig to keep the UE 110 in the RRC_INACTIVE state.

With such a procedure, the UE 110 may perform an SDT without transitioning its state to the RRC_CONNECTED.

An exemplary 2-step RACH-based SDT is shown by the bottom portion of FIG. 3. The UE 110 may stay in the RRC_INACTIVE state when the procedure is begun. The UE 110 may determine UL radio resource for RACH and SDT, for example, by monitoring system information broadcasted by the gNB 120 or by receiving a UE-specific RRC message before transitioning to the RRC_INACTIVE state, and then attempt random access procedure by transmitting RACH preamble or a physical random access channel (PRACH or MsgA) and the SDT on the configured RACH and PUSCH resources, respectively, at step 360.

When the gNB 120 receives the PRACH plus SDT transmission, it may decode the MsgA and the SDT data and transmit the MsgB to the UE 110 to acknowledge the successful reception of the SDT. In some embodiments, the MsgB may be an RRC Release message with a suspendConfig to keep the UE 110 in the RRC_INACTIVE state.

and the gNB 120 may acknowledge the reception of the SDT data, for example, by an RRC Release message with a suspendConfig, to keep the UE 110 in the RRC_INACTIVE state.

Figure 4:
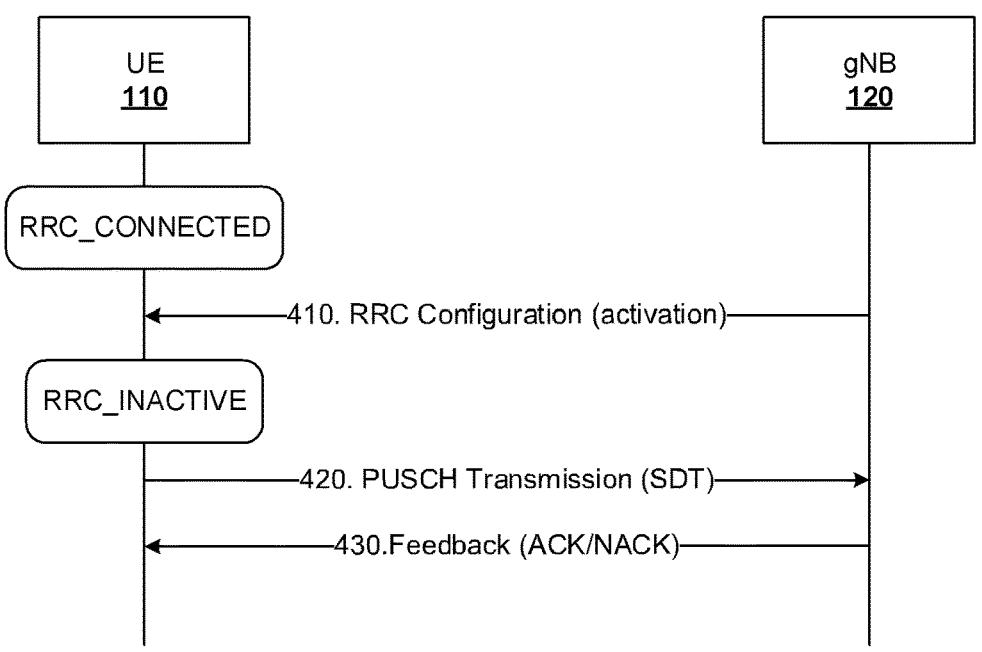
FIG. 4 is a diagram illustrating an exemplary configured grant-based SDT procedure according to an embodiment of the present disclosure.

No matter which of the above procedures is used, the UE 110 may conduct its SDT procedure without transitioning to the RRC_CONNECTED state and thus avoid the signaling overhead and reduce its power consumption. Further, although FIG. 3 and FIG. 4 show the RACH-based SDT and CG-based SDT procedures, they are merely two specific implementations of a SDT procedure, and the present disclosure is not limited thereto. For example, a different SDT procedure based on a different procedure may be adopted. For another example, the UE 110 may be configured with a different UL transmission timing for SDT than that shown in FIG. 3 and FIG. 4. For yet another example, the UE 110 may be configured with a different CORESET/SS for monitoring PDCCH during a SDT procedure than that used during the above RA-based SDT procedure or CG-based SDT procedure.

Further, CG PUSCH resources are the PUSCH resources that configured in advance for the UE. When there is uplink data available at a UE's buffer, it may immediately start uplink transmission using the pre-configured PUSCH resources without waiting for an UL grant from the gNB, thus reducing the latency. NR supports CG type 1 PUSCH transmission and CG type 2 PUSCH transmission. For both two types, the PUSCH resources (time and frequency allocation, periodicity, etc.) are preconfigured via dedicated RRC signaling. The CG type 1 PUSCH transmission is activated/deactivated by RRC signaling, while the CG type 2 PUSCH transmission is activated/deactivated by an UL grant using downlink control information (DCI) signaling.

the CG period, for example, in NR R16 can be of following values depending on the CP configuration and the numerology:

| periodicity |
| --- |
| Periodicity for UL transmission without UL grant for type 1 and type 2 (see TS 38.321 [3], clause 5.8.2). The following periodicities are supported depending on the configured subcarrier spacing [symbols]: |

| | |
| --- | --- |
| 15 kHz: | 2, 7, n*14, where n = {1, 2, 4, 5, 8, 10, 16, 20, 32, 40, 64, 80, 128, 160, 320, 640} |
| 30 kHz: | 2, 7, n*14, where n = {1, 2, 4, 5, 8, 10, 16, 20, 32, 40, 64, 80, 128, 160, 256, 320, 640, 1280} |
| 60 kHz with normal CP | 2, 7, n*14, where n = {1, 2, 4, 5, 8, 10, 16, 20, 32, 40, 64, 80, 128, 160, 256, 320, 512, 640, 1280, 2560} |
| 60 kHz with ECP: | 2, 6, n*12, where n = {1, 2, 4, 5, 8, 10, 16, 20, 32, 40, 64, 80, 128, 160, 256, 320, 512, 640, 1280, 2560} |
| 120 kHz: | 2, 7, n*14, where n={1, 2, 4, 5, 8, 10, 16, 20, 32, 40, 64, 80, 128, 160, 256, 320, 512, 640, 1024, 1280, 2560, 5120} |

Further, if the SDT to be transmitted has a greater size than that can be transmitted with the Msg3 or MsgA, the SDT may be split into multiple pieces and transmitted to the gNB 120 following the RACH procedure. For example, these data may be transmitted together with an RRCResumeRequest message, and the gNB 120 may respond it with an RRC Release message with a suspendConfig to keep the UE 110 in the RRC_INACTIVE state and acknowledge the reception of the SDTs.

FIG. 4 is a diagram illustrating an exemplary configured grant (CG)-based SDT procedure according to an embodiment of the present disclosure.

As shown in FIG. 4, the UE 110 may receive a semi-persistently assigned UL resource for SDT at step 410 when it is in the RRC_CONNECTED state. After transitioning to the RRC_INACTIVE state, the UE 110 may continue to use such UL resources for SDT. For example, the UE 110 may transmit its UL SDT data over the assigned semi-persistent radio resource to the gNB 120 in the RRC_INACTIVE state, Next, some embodiments of the present disclosure will be described to explain the search space and CORESET configuration for PDCCH monitoring during the SDT.

Following related agreements were made in RAN2:

For RACH based solutions, upon successful completion of contention resolution, the UE shall monitor the C-RNTI.

When UE is in RRC_INACTIVE, it should be possible to send multiple UL and DL packets as part of the same SDT mechanism and without transitioning to RRC-_CONNECTED on dedicated grant.

According to above agreements, a UE in RRC_INACTIVE should be able to send multiple UL and DL packets as part of the same SDT mechanism and the UE has to monitor the PDCCH addressed to the C-RNTI after successful completion of the RACH procedure during RA-SDT or when UE is doing CG based SDT.

As mentioned above, a CORESET consists of a number of resource blocks in the frequency domain and a number of OFDM symbols in the time domain at which a UE may monitors a PDCCH. Each PDCCH consists of one or more control-channel elements (CCEs). A control-channel element (CCE) consists of 6 resource-element groups (REGs) where a resource-element group equals one resource block during one OFDM symbol. Resource-element groups within a control-resource set are numbered in increasing order in a time-first manner, starting with 0 for the first OFDM symbol and the lowest-numbered resource block in the control resource set.

A UE may monitor a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

A UE may be configured with multiple control-resource sets and search spaces. A set of PDCCH candidates for a UE to monitor is defined in terms of PDCCH search space sets. A search space set may be a CSS set or a USS set. A UE may monitor PDCCH candidates in one or more of the following search spaces sets:

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG
- a TypeOA-PDCCH CSS set configured by searchSpaceOtherSystemInformation in PDCCH-ConfigCommon for a DCI format with CRC scrambled by a SI-RNTI on the primary cell of the MCG

- a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell
- a Type2-PDCCH CSS set configured by paging-SearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI and
- a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

The common CORESET and common search space configurations may be found in, for example, the IE PDCCH-ConfigCommon from the 3GPP TS 38.331 V16.2.0.

PDCCH-ConfigCommon

The IE PDCCH-ConfigCommon is used to configure cell specific PDCCH parameters provided in SIB as well as in dedicated signaling.

| PDCCH-ConfigCommon information element |
|---|

```
-- ASN1START
-- TAG-PDCCH-CONFIGCOMMON-START
PDCCH-ConfigCommon ::=                          SEQUENCE {
controlResourceSetZero                              ControlResourceSetZero
OPTIONAL,                    -- Cond InitialBWP-Only
commonControlResourceSet                            ControlResourceSet
OPTIONAL,                    -- Need R
searchSpaceZero                                     SearchSpaceZero
OPTIONAL,                    -- Cond InitialBWP-Only
commonSearchSpaceList                               SEQUENCE (SIZE(1..4)) OF SearchSpace
OPTIONAL,                    -- Need R
search SpaceSIB1                                    SearchSpaceId
OPTIONAL,                    -- Need S
searchSpaceOtherSystemInformation                   SearchSpaceId
OPTIONAL,                    -- Need S
pagingSearchSpace                                   SearchSpaceId
OPTIONAL,                    -- Need S
ra-SearchSpace                                      SearchSpaceId
OPTIONAL,                    -- Need S
    ...,
    [[
    firstPDCCH-MonitoringOccasionOfPO               CHOICE {
        sCS15KHZoneT                                        SEQUENCE (SIZE
(1..maxPO-perPF)) OF INTEGER (0..139),
            sCS30KHZoneT-SCS15KHZhalfT                      SEQUENCE (SIZE
(1..maxPO-perPF)) OF INTEGER (0..279),
            sCS60KHZoneT-SCS30KHZhalfT-SCS15KHZquarterT     SEQUENCE (SIZE
(1..maxPO-perPF)) OF INTEGER (0..559),
            sCS120KHZoneT-SCS60KHZhalfT-SCS30KHZquarterT-SCS15KHZoneEighthT     SEQUENCE (SIZE
(1..maxPO-perPF)) OF INTEGER (0..1119),
            sCS120KHZhalfT-SCS60KHZquarterT-SCS30KHZoneEighthT-SCS15KHZoneSixteenthT     SEQUENCE (SIZE
(1..maxPO-perPF)) OF INTEGER (0..2239),
            sCS120KHZquarterT-SCS60KHZoneEighthT-SCS30KHZoneSixteenthT     SEQUENCE (SIZE
(1..maxPO-perPF)) OF INTEGER (0..4479),
            sCS120KHZoneEighthT-SCS60KHZoneSixteenthT     SEQUENCE (SIZE
(1..maxPO-perPF)) OF INTEGER (0..8959),
            sCS120KHZoneSixteenthT                          SEQUENCE (SIZE
(1..maxPO-perPF)) OF INTEGER (0..17919)
    }
```

-continued

| PDCCH-ConfigCommon information element |
| --- |

```
OPTIONAL                           -- Cond OtherBWP
  ]],
  [[
commonSearchSpaceListExt-r16                              SEQUENCE
(SIZE (1..4)) OF SearchSpaceExt-r16         OPTIONAL -- Need R
    ]]
}
-- TAG-PDCCH-CONFIGCOMMON-STOP
-- ASN1STOP
```

Further, the Search Space IE is defined as below, where a set of PDCCH monitoring occasions are defined periodically, and there could be a set of PDCCH candidates on each PDCCH monitoring occasion depending on the CORESET size and the aggregation levels supported, details can be found, for example, in 3GPP TS 38.331 V16.2.0:

SearchSpace

The IE SearchSpace defines how/where to search for PDCCH candidates. Each search space is associated with one ControlResourceSet. For a scheduled cell in the case of cross carrier scheduling, except for nrofCandidates, all the optional fields are absent (regardless of their presence conditions).

| SearchSpace information element |
| --- |

```
-- ASN1START
-- TAG-SEARCHSPACE-START
SearchSpace ::=                              SEQUENCE {
    searchSpaceId                              SearchSpaceId,
    controlResourceSetId                       ControlResourceSetId
OPTIONAL,                                       -- Cond SetupOnly
    monitoringSlotPeriodicityAndOffset         CHOICE {
        sl1                                        NULL,
        sl2                                        INTEGER (0..1),
        sl4                                        INTEGER (0..3),
        sl5                                        INTEGER (0..4),
        sl8                                        INTEGER (0..7),
        sl10                                       INTEGER (0..9),
        sl16                                       INTEGER (0..15),
        sl20                                       INTEGER (0..19),
        sl40                                       INTEGER (0..39),
        sl80                                       INTEGER (0..79),
        sl160                                      INTEGER (0..159),
        sl320                                      INTEGER (0..319),
        sl640                                      INTEGER (0..639),
        sl1280                                     INTEGER (0..1279),
        sl2560                                     INTEGER (0..2559)
    }
OPTIONAL,                     -- Cond Setup
    duration                                   INTEGER (2..2559)
OPTIONAL,                     -- Need R
    monitoringSymbolsWithinSlot                BIT STRING (SIZE (14))
OPTIONAL,                     -- Cond Setup
    nrofCandidates                             SEQUENCE {
        aggregationLevel1                          ENUMERATED {n0, n1, n2, n3, n4, n5, n6, n8},
        aggregationLevel2                          ENUMERATED {n0, n1, n2, n3, n4, n5, n6, n8},
        aggregationLevel4                          ENUMERATED {n0, n1, n2, n3, n4, n5, n6, n8},
        aggregationLevel8                          ENUMERATED {n0, n1, n2, n3, n4, n5, n6, n8},
        aggregationLevel16                         ENUMERATED {n0, n1, n2, n3, n4, n5, n6, n8}
    }
OPTIONAL,                     -- Cond Setup
    searchSpaceType                            CHOICE {
        common                                     SEQUENCE {
            dci-Format0-0-AndFormat1-0                 SEQUENCE {
                ...
            }
OPTIONAL,                     -- Need R
            dci-Format2-0                              SEQUENCE {
                nrofCandidates-SFI                         SEQUENCE {
                    aggregationLevel1                          ENUMERATED {n1, n2}
OPTIONAL,                     -- Need R
                    aggregationLevel2                          ENUMERATED {n1, n2}
OPTIONAL,                     -- Need R
                    aggregationLevel4                          ENUMERATED {n1, n2}
OPTIONAL,                     -- Need R
                    aggregationLevel8                          ENUMERATED {n1, n2}
OPTIONAL,                     -- Need R
                    aggregationLevel16                         ENUMERATED {n1, n2}
```

-continued

| SearchSpace information element |
|---|

```
OPTIONAL              -- Need R
                          },
                          ...
                      }
OPTIONAL,             -- Need R
                      dci-Format2-1                      SEQUENCE {
                          ...
                      }
OPTIONAL,             -- Need R
                      dci-Format2-2                                        SEQUENCE {
                          ...
                      }
OPTIONAL,             -- Need R
                      dci-Format2-3                      SEQUENCE {
                          dummy1                             ENUMERATED {sl1, sl2 sl4, sl5, sl8,
sl10, sl16, sl20 } OPTIONAL,    -- Cond Setup
                          dummy2                             ENUMERATED {n1, n2 },
                          ...
                      }
OPTIONAL              -- Need R
    },
    ue-Specific                                          SEQUENCE {
                      dci-Formats                            ENUMERATED {formats0-0-And-1-0, formats0-
1-And-1-1},
                      ...,
                      [[
                      dci-Formats-MT-r16         ENUMERATED {formats2-5}
OPTIONAL,                 -- Need R
                      dci-FormatsSL-r16              ENUMERATED {formats0-0-And-1-0, formats0-1-And-
1-1, formats3-0, formats3-1,
                                                         formats3-0-And-3-1}
OPTIONAL,              -- Need R
                      dci-FormatsExt-r16            ENUMERATED {formats0-2-And-1-2, formats0-1-And-
1-1And-0-2-And-1-2}
OPTIONAL              -- Need R
                      ]]
    }
  }
OPTIONAL              -- Cond Setup2
}
SearchSpaceExt-r16 ::=                        SEQUENCE {
    controlResourceSetId-r16                  ControlResourceSetId-r16
OPTIONAL,             -- Cond SetupOnly2
    searchSpaceType-r16                       SEQUENCE {
        common-r16                                SEQUENCE {
                      dci-Format2-4-r16                  SEQUENCE {
                          nrofCandidates-CI-r16              SEQUENCE {
                              aggregationLevel1-r16              ENUMERATED {n1, n2}
OPTIONAL,             -- Need R
                              aggregationLevel2-r16              ENUMERATED {n1, n2}
OPTIONAL,             -- Need R
                              aggregationLevel4-r16              ENUMERATED {n1, n2}
OPTIONAL,             -- Need R
                              aggregationLevel8-r16              ENUMERATED {n1, n2}
OPTIONAL,             -- Need R
                              aggregationLevel16-r16             ENUMERATED {n1, n2}
OPTIONAL              -- Need R
                              },
                              ...
                          }
OPTIONAL,             -- Need R
                      dci-Format2-5-r16                  SEQUENCE {
                          nrofCandidates-IAB-r16             SEQUENCE {
                              aggregationLevel1-r16              ENUMERATED {n1, n2}
OPTIONAL,             -- Need R
                              aggregationLevel2-r16              ENUMERATED {n1, n2}
OPTIONAL,             -- Need R
                              aggregationLevel4-r16              ENUMERATED {n1, n2}
OPTIONAL,             -- Need R
                              aggregationLevel8-r16              ENUMERATED {n1, n2}
OPTIONAL,             -- Need R
                              aggregationLevel16-r16             ENUMERATED {n1, n2}
OPTIONAL              -- Need R
                              },
                              ...
                          }
```

-continued

| SearchSpace information element |
|---|

```
OPTIONAL,              -- Need R
                       dci-Format2-6-r16              SEQUENCE {
                            ...
                       }
OPTIONAL,              -- Need R
                            ...
        }
    }
OPTIONAL,                    -- Cond Setup3
    searchSpaceGroupIdList-r16              SEQUENCE (SIZE (1..2)) OF INTEGER (0..1)
OPTIONAL,              -- Need R
    freqMonitorLocations-r16              BIT STRING (SIZE (5))
OPTIONAL              -- Need R
}
-- TAG-SEARCHSPACE-STOP
-- ASN1STOP
```

As mentioned above, for SDT, the UE in RRC_INAC-TIVE should be able to send multiple UL and DL packets as part of the same SDT mechanism and the UE has to monitor the PDCCH addressed to the C-RNTI after successful completion of the RACH procedure during RA-SDT or when UE is doing CG based SDT. To monitor the PDCCH, the CORESET and search space for RRC inactive UEs needs to be defined, considering UE monitoring efforts and power consumption in RRC inactive state, PDCCH transmission resource density, transmission latency, and/or the signaling overhead.

Therefore, some embodiments of the present disclosure provide methods on how to define and determine the CORE-SET and/or search space for UEs doing SDT in RRC_I-NACTIVE state, for example, by reusing/modifying existing common and/or dedicated CORESETs/search spaces and/or by efficiently defining separate CORESETs/search spaces.

With the proposed methods, CORESET and/or search space for monitoring PDCCH in RRC inactive state can be efficiently defined for small data transmission, considering UE monitoring efforts in RRC inactive state, PDCCH transmission resource density, transmission latency, and/or the signaling overhead.

In an embodiment, the PDCCH, monitored during small data transmission, mentioned in following embodiments may be a PDCCH for a DCI format with CRC scrambled by C-RNTI or by a CS-RNTI or by a SDT specific RNTI (e.g., SDT-RNTI).

In an embodiment, for PDCCH monitoring by UEs during small data transmission, the search space may be the Type1-PDCCH CSS set, i.e., defined by ra-SearchSpace.

For RACH based SDT, the RA search space may be used for monitoring PDCCH scheduling RAR PDSCH or MsgB PDSCH in 4-step RACH or 2-step RACH, and this search space may also be used for PDCCH monitoring with C-RNTI, for example, when a Type3-PDCCH CSS set is not available.

For CG based SDT, the RA search space may be the one that the UE used in RRC connected state before it enters into the RRC inactive state.

This will reduce the overhead of the signaling on the search space for small data transmission, e.g., a Type3-PDCCH CSS set may be avoided.

With a Type1-PDCCH CSS set, the latency may also be reduced compared to using Type0-PDCCH CSS set since the issue is that if Type0-PDCCH CSS set is used as the CSS for PDCCH monitoring for SDT, then, the delay between an uplink small data transmission and a downlink PDCCH monitoring may be up to 20 ms (when SSB and CORESET0 are multiplexed in a TDM manner) and up to the SS periodicity (when the SSB and CORESET0 are multiplexed in a FDM manner). While with the type 1 C-SS, the delay may be 1 slot in minimum.

In another embodiment, the search space configured for PDCCH monitoring during the small data transmissions may be at least one of
    the Type3-PDCCH CSS set
    a USS set configured in RRC connected state before RRC release
        e.g., the SearchSpace in PDCCH-Config when UE was in RRC connected state
    In an embodiment, when Type3-PDCCH CSS set is not available, a Type1-PDCCH CSS set may be used for PDCCH (e.g., addressed by C-RNTI or CS-RNTI) monitoring during small data transmission.

In an embodiment, the search space configured for PDCCH monitoring during the small data transmissions may be the same as the search space used by one or more of the following messages:
    Paging
        E.g., the "pagingSearchSpace" defined in PDCCH-ConfigCommon
    System information block type 1
        E.g., "searchSpaceSIB1" defined in PDCCH-Config-Common
    Other system information
        E.g., "searchSpaceOtherSystemInformation" defined in PDCCH-ConfigCommon
    In an embodiment, when existing search spaces available for UEs in RRC connected state are reused, a search space ID for the search space actually used for PDCCH monitoring during SDT may be a predetermined value or is indicated in one or more of the following messages or layer 1 signaling:
        the dedicated RRC message, e.g., in RRC release message.
    In a MAC PDU,
        E.g., in the RAR or MsgB message when a random access is applied
        Here the RAR or MsgB message may be the response message addressed by RA-RNTI, or MsgB-RNTI or C-RNTI.
    The msg4 message when 4-step RACH is used
    The DCI for scheduling of a downlink transmission for which the search space is predetermined, e.g., the downlink transmission is RAR or MsgB The RAR or MsgB message may be the response message addressed by RA-RNTI, MsgB-RNTI or C-RNTI.

The PDCCH monitoring for RAR/MsgB themselves may be in the predetermined search space and a CORESET. For example, it may be the Type1-PDCCH CSS set and the associated CORESET used for random access for UEs in RRC connected state.

In an embodiment, a separate defined or modified search space may be configured for PDCCH monitoring during the small data transmissions via system information message and/or the RRC dedicated signaling.

This embodiment provides more flexibility to configure a search space specifically for the PDCCH monitoring in SDT. The separately defined search space may provide a lower PDCCH monitoring latency of SDT if a smaller PDCCH monitoring occasion periodicity is configured, while it may also reduce power consumption due to blind detection of PDCCHs in RRC inactive state if a larger PDCCH monitoring occasion periodicity is configured.

In some embodiments, the SS may be separately defined. For example, a search space specific for SDT transmission may be configured in an RRC release message for UE to monitor the PDCCH addressed by C-RNTI during the small data transmission in RRC inactive state. For another example, a search space separately defined in system information may be used for UEs to do SDT.

For example, the related part of the 3GPP TS 38.331 may be modified as follows:

However, the present disclosure is not limited to such a modification.

In some embodiments, the separate SS may be determined via modifying the existing search spaces. For example, more PDCCH monitoring occasions in Type0-PDCCH CSS set with CORESET0 when a Type0-PDCCH CSS set is used to reduce the latency for PDCCH monitoring in small data transmission. Monitoring periodicity of the modified search space for small data transmission is every slot (or a period no larger than a predetermined value).

Further, if the total number of monitoring occasions for the reception of SIB1 (i.e., RMSI) is indicated as one in a slot in PBCH, to monitor the PDCCHs during SDT in RRC inactive state, UE may monitor the same search space symbols as RMSI. If more than one PDCCH monitoring occasions exist in one slot, a predetermined one of the PDCCH monitoring occasions may be used for PDCCH (e.g., addressed by C-RNTI) monitoring during SDT transmission, or the actual CORESET monitoring occasion(s) to be monitored in this slot may be signaled in RRC signaling, or it may be associated with one or more parameters: the CORESET configuration, the PRACH preamble configurations for SDT, CG configurations for SDT, system frame number etc.

In an embodiment, the search space configured for PDCCH monitoring during the small data transmissions may be a UE specific search space, e.g., defined in an RRC release message.

With this method, the search space for small data transmission for different UEs may be independent from each other and it does not have to be in a common search space shared by all UEs either.

---

| PDCCH-ConfigCommon information element |
|---|

```
-- ASN1START
-- TAG-PDCCH-CONFIGCOMMON-START
PDCCH-ConfigCommon ::=              SEQUENCE {
    controlResourceSetZero            ControlResourceSetZero
OPTIONAL,              -- Cond InitialBWP-Only
    commonControlResourceSet          ControlResourceSet
OPTIONAL,            -- Need R
    searchSpaceZero                   SearchSpaceZero
OPTIONAL,            -- Cond InitialBWP-Only
    commonSearchSpaceList             SEQUENCE (SIZE (1..4)) OF SearchSpace
OPTIONAL,            -- Need R
    searchSpaceSIB1                   SearchSpaceId
OPTIONAL,            -- Need S
    searchSpaceOtherSystemInformation SearchSpaceId
OPTIONAL,            -- Need S
    pagingSearchSpace                 SearchSpaceId
OPTIONAL,            -- Need S
    ra-SearchSpace                    SearchSpaceId
OPTIONAL,            -- Need S
    sdt-SearchSpace                   SearchSpaceId
OPTIONAL,            -- Need S
    ...,
-- TAG-PDCCH-CONFIGCOMMON-STOP
-- ASN1STOP
```

---

The definition of the sdt-SearchSpace IE may be added to the 3GPP TS 38.331 as follows:

---

| sdt-SearchSpace |
|---|
| ID of the Search space for monitoring PDCCH for C-RNTI during small data transmission. If the field is absent, the UE does not monitor the PDCCH transmission addressed by C-RNTI for small data transmission in this BWP. |

In an embodiment, the CORESET used for PDCCH monitoring during the small data transmissions may be a fixed CORESET. In an embodiment, it may be always CORESET0.

With this method, there's no need to have more than 1 CORESET definition when the UE is in the RRC inactive state.

In an embodiment, a separate CORESET may be configured for PDCCH monitoring during the small data transmissions via system information message and/or the RRC dedicated signaling.

In one example, an information element sdtControlResourceSet may be defined in system information for the CORESET used for the PDCCH monitoring addressed e.g., by C-RNTI during the SDT transmissions in RRC inactive state:

Here the RAR or MsgB message may be the response message addressed by RA-RNTI, MsgB-RNTI or C-RNTI.

The msg4 message when 4-step RACH is used

The DCI for scheduling of a downlink transmission for which the search space is predetermined, e.g., the downlink transmission is RAR or MsgB transmitted during the RACH based SDT The RAR or MsgB message may be the response message addressed by RA-RNTI, MsgB-RNTI or C-RNTI.

The PDCCH monitoring for RAR/MsgB themselves may be in the predetermined search space and a CORESET. For example, it may be the Type1-PDCCH CSS set and the associated CORESET used for random access for UEs in RRC connected state.

---

PDCCH-ConfigCommon information element

```
-- ASN1START
-- TAG-PDCCH-CONFIGCOMMON-START
PDCCH-ConfigCommon ::=                    SEQUENCE {
     controlResourceSetZero               ControlResourceSetZero
OPTIONAL,               -- Cond InitialBWP-Only
     commonControlResourceSet             ControlResourceSet
OPTIONAL,               -- Need R
     sdtControlResourceSet                ControlResourceSet
OPTIONAL,               -- Need R
     searchSpaceZero                      SearchSpaceZero
OPTIONAL,               -- Cond InitialBWP-Only
     commonSearchSpaceList                SEQUENCE (SIZE (1..4)) OF SearchSpace
OPTIONAL,               -- Need R
     searchSpaceSIB1                      SearchSpaceId
OPTIONAL,               -- Need S
     searchSpaceOtherSystemInformation    SearchSpaceId
OPTIONAL,               -- Need S
     pagingSearchSpace                    SearchSpaceId
OPTIONAL,               -- Need S
     ra-SearchSpace                       SearchSpaceId
OPTIONAL,               -- Need S
     ...,
}
-- TAG-PDCCH-CONFIGCOMMON-STOP
-- ASN1STOP
```

---

The definition of the sdtControlResourceSet IE may be added to the 3GPP TS 38.331 as follows:

This method will make it more flexible to configure any CORESET to be used by UE doing SDT.

--- sdtControlResourceSet

An additional control resource set which may be configured and used for any common or UE-specific search space for small data transmission in RRC inactive state.

---

In another example, a UE specific CORESET may be defined in the RRC release message for the PDCCH monitoring addressed, for example, by C-RNTI during the SDT transmissions in RRC inactive state.

In an embodiment, the CORESET may be one of a set of candidate CORESETs.

Here the candidate CORESETs may have CORESET IDs defined when UEs are in RRC connected state and/or have the new CORESET IDs defined in RRC release message or after RRC release.

In an embodiment, the CORESET ID of the CORESET used for PDCCH monitoring during SDT may be signaled in one or more of the following messages or layer 1 signaling:

the dedicated RRC message, e.g., in release message.

a MAC PDU,

E.g., in the RAR or MsgB message when a random access is applied

Figure 5:
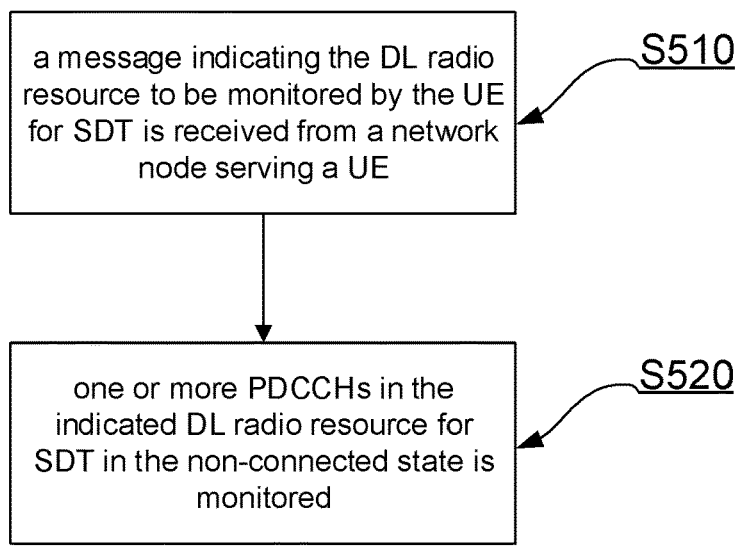
FIG. 5 is a flow chart illustrating an exemplary method at a UE for monitoring PDCCH in DL radio resource for SDT in a non-connected state according to an embodiment of the present disclosure.

FIG. 5 is a flow chart of an exemplary method 500 for monitoring PDCCH in DL radio resource for SDT in a non-connected state according to an embodiment of the present disclosure. The method 500 may be performed at a user equipment (e.g., the UE 110). The method 500 may comprise step S510 and step S520. However, the present disclosure is not limited thereto. In some other embodiments, the method 500 may comprise more steps, less steps, different steps or any combination thereof. Further the steps of the method 500 may be performed in a different order than that described herein. Further, in some embodiments, a step in the method 500 may be split into multiple sub-steps and performed by different entities, and/or multiple steps in the method 500 may be combined into a single step.

The method 500 may begin at step S510 where a message indicating the DL radio resource to be monitored by the UE for SDT may be received from a network node serving the UE.

At step S520, one or more PDCCHs may be monitored in the indicated DL radio resource for SDT in the non-connected state.

In some embodiments, the non-connected state may be the RRC_INACTIVE state. In some embodiments, the DL radio resource may be indicated in the message by a control resource set (CORESET) field or a CORESET ID field, a search space (SS) field or an SS ID field, or a combination thereof. In some embodiments, the message may be a system information message or a UE specific RRC message. In some embodiments, the system information message may be an RRC System Information Block 1 (SIB1) message or an RRC System Information (SI) message.

In some embodiments, the DL radio resource may be indicated in the message by a Type1 common SS field. In some embodiments, the step of monitoring one or more PDCCHs in the indicated DL radio resource for SDT in the non-connected state may comprise one or more of: monitoring, in the indicated DL radio resource, a PDCCH which schedules a Physical Downlink Share Channel (PDSCH) for a random access response (RAR) in a 4-step random-access-channel (RACH)-based SDT; monitoring, in the indicated DL radio resource, a PDCCH which schedules a PDSCH for a MsgB in a 2-step RACH-based SDT; monitoring, in the indicated DL radio resource, a PDCCH with a cyclic redundancy check (CRC) scrambled by a cell-radio network temporary identifier (C-RNTI) assigned to the UE; and monitoring, in the indicated DL radio resource, a PDDCH which schedules a PDSCH for a configured-grant (CG)-based SDT. In some embodiments, the DL radio resource may be indicated in the message by a Type3 common SS field. In some embodiments, the DL radio resource may be indicated in the UE specific RRC message by a UE specific SS field. In some embodiments, after the step of receiving, from a network node serving the UE, a message indicating the DL radio resource to be monitored by the UE for SDT and before the step of monitoring one or more PDCCHs in the indicated DL radio resource for SDT in the non-connected state, the method 500 may further comprise: transitioning from the RRC_CONNECTED state to the RRC_I-NACTIVE state. In some embodiments, the DL radio resource may be indicated in the message by a Type0 common SS field, a TypeOA common SS field, and/or a Type2 common SS field. In some embodiments, in a case where multiple SSs are configured at the UE, the method 500 may further comprise: determining one from the multiple SSs according to a predetermined rule, wherein the step of monitoring one or more PDCCHs in the indicated DL radio resource for SDT in the non-connected state may comprise: monitoring one or more PDCCHs in the DL radio resource corresponding to the determined SS.

In some embodiments, in a case where multiple SSs are configured, the method 500 may further comprise: receiving a second message comprising at least one SS ID field identifying at least one of the multiple SSs to be used for SDT monitoring, wherein the step of monitoring one or more PDCCHs in the indicated DL radio resource for SDT in the non-connected state may comprise: monitoring one or more PDCCHs in the DL radio resource corresponding to the identified SS. In some embodiments, the second message may be one of: a dedicated RRC message; a medium access control (MAC) protocol data unit (PDU); a Msg4 in a RACH procedure; and a downlink control information (DCI) message. In some embodiments, the DCI message may be used for scheduling a downlink transmission for which the SS is known. In some embodiments, the UE specific RRC message may be an RRC release message which triggers the UE to transition into the RRC_INACTIVE state. In some embodiments, the message may comprise an SS field dedicated for SDT. In some embodiments, the number of DL radio resources assigned for SDT in a period of time may be determined at least based on latency requirement and/or power consumption requirement for the SDT. In some embodiments, the SS field dedicated for SDT may indicate additional DL radio resource for SDT, which is used together with the DL radio resource indicated by the Type0 common SS field for SDT.

In some embodiments, in a case where more than one monitoring occasion per slot may be indicated by the message, before the step of monitoring one or more PDDCHs in the indicated DL radio resource for SDT in the non-connected state, the method 500 may further comprise: determining one of the monitoring occasions per slot to be monitored, and where the step of monitoring one or more PDCCHs in the indicated DL radio resource for SDT in the non-connected state may comprise: monitoring one or more PDCCHs in the determined monitoring occasion for SDT. In some embodiments, the step of determining one of the monitoring occasions per slot to be monitored may comprise one of: receiving, from the network node, an RRC message indicating the monitoring occasion per slot to be monitored; determining the monitoring occasion per slot to be monitored according to a pre-determined rule; and determining the monitoring occasion per slot to be monitored at least based on a corresponding CORESET configuration, a corresponding physical random access channel (PRACH) preamble configuration for SDT, a corresponding CG configuration for SDT, and/or a corresponding system frame number.

In some embodiments, the CORESET field may indicate DL radio resource corresponding to CORESET0. In some embodiments, the message may comprise a CORESET field dedicated for SDT. In some embodiments, the RRC release message may indicate a UE specific CORESET. In some embodiments, in a case where multiple CORESETs may be configured at the UE, the method 500 may further comprise: receiving, from the network node, a third message comprising at least one CORESET ID field identifying at least one of the multiple CORESETs to be used for SDT monitoring, wherein the step of monitoring one or more PDCCHs in the indicated DL radio resource for SDT in the non-connected state may comprise: monitoring one or more PDCCHs in the DL radio resource corresponding to the identified CORESET. In some embodiments, the third message may be one of: a dedicated RRC message; a medium access control (MAC) protocol data unit (PDU); a Msg4 in a RACH procedure; a downlink control information (DCI) message. In some embodiments, the DCI message may be used for scheduling a downlink transmission for which the CORESET is known.

Figure 6:
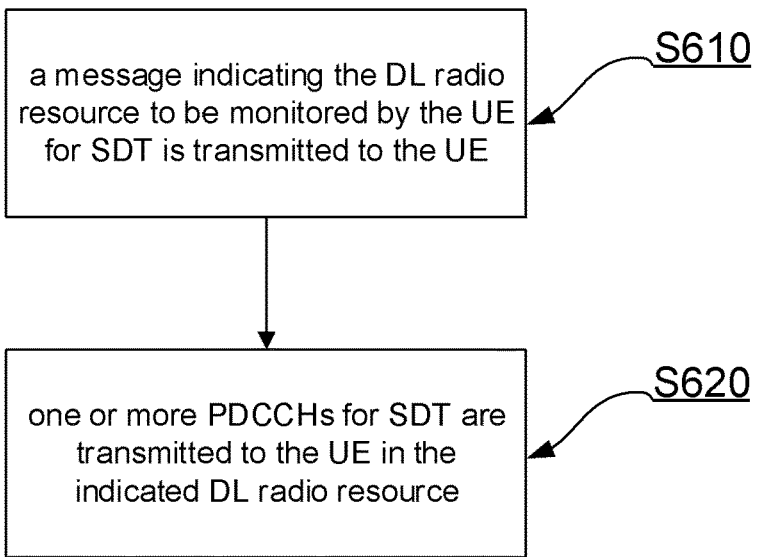
FIG. 6 is a flow chart illustrating an exemplary method at a network node for configuring a UE with DL radio resource for PDCCH for SDT in a non-connected state according to an embodiment of the present disclosure.

FIG. 6 is a flow chart of an exemplary method 600 for configuring a UE with DL radio resource for PDCCH for SDT in a non-connected state according to an embodiment of the present disclosure. The method 600 may be performed at a network node (e.g., the gNB 120). The method 600 may comprise step S610 and step S620. However, the present disclosure is not limited thereto. In some other embodiments, the method 600 may comprise more steps, less steps, different steps or any combination thereof. Further the steps of the method 600 may be performed in a different order than that described herein. Further, in some embodiments, a step in the method 600 may be split into multiple sub-steps and performed by different entities, and/or multiple steps in the method 600 may be combined into a single step.

The method 600 may begin at step S610 where a message indicating the DL radio resource to be monitored by the UE for SDT may be transmitted to the UE.

At step S620, one or more PDCCHs for SDT may be transmitted to the UE in the indicated DL radio resource.

In some embodiments, the non-connected state may be the RRC_INACTIVE state for the UE. In some embodiments, the DL radio resource may be indicated in the message by a control resource set (CORESET) field or a CORESET ID field, a search space (SS) field or an SS ID field, or a combination thereof. In some embodiments, the message may be a system information message or a UE specific RRC message. In some embodiments, the system information message may be an RRC System Information Block 1 (SIB1) message or an RRC System Information (SI) message.

In some embodiments, the DL radio resource may be indicated in the message by a Type1 common SS field. In some embodiments, the step of transmitting, to the UE, one or more PDCCHs for SDT in the indicated DL radio resource may comprise one or more of: transmitting, in the indicated DL radio resource, a PDCCH which schedules a Physical Downlink Share Channel (PDSCH) for a random access response (RAR) in a 4-step random-access-channel (RACH)-based SDT; transmitting, in the indicated DL radio resource, a PDCCH which schedules a PDSCH for a MsgB in a 2-step RACH-based SDT; transmitting, in the indicated DL radio resource, a PDCCH with a cyclic redundancy check (CRC) scrambled by a cell-radio network temporary identifier (C-RNTI) assigned to the UE; and transmitting, in the indicated DL radio resource, a PDDCH which schedules a PDSCH for a configured-grant (CG)-based SDT. In some embodiments, the DL radio resource may be indicated in the message by a Type3 common SS field. In some embodiments, the DL radio resource may be indicated in the UE specific RRC message by a UE specific SS field. In some embodiments, the DL radio resource may be indicated in the message by a Type0 common SS field, a Type0A common SS field, and/or a Type2 common SS field.

In some embodiments, in a case where multiple SSs are configured at the UE, the method 600 may further comprise: determining one from the multiple SSs according to a predetermined rule, wherein the step of transmitting, to the UE, one or more PDCCHs for SDT in the indicated DL radio resource may comprise: transmitting, to the UE, one or more PDCCHs for SDT in the DL radio resource corresponding to the determined SS. In some embodiments, in a case where multiple SSs are configured at the UE, the method 600 may further comprise: transmitting a second message comprising at least one SS ID field identifying at least one of the multiple SSs to be used for SDT monitoring, wherein the step of transmitting, to the UE, one or more PDCCHs for SDT in the indicated DL radio resource may comprise: transmitting, to the UE, one or more PDCCHs for SDT in the DL radio resource corresponding to the identified SS. In some embodiments, the second message may be one of: a dedicated RRC message; a medium access control (MAC) protocol data unit (PDU); a Msg4 in a RACH procedure; a downlink control information (DCI) message.

In some embodiments, the DCI message may be used for scheduling a downlink transmission for which the SS is known. In some embodiments, the UE specific RRC message may be an RRC release message which triggers the UE to transition into the RRC_INACTIVE state. In some embodiments, the message may comprise an SS field dedicated for SDT. In some embodiments, the number of DL radio resources assigned for SDT in a period of time may be determined at least based on latency requirement and/or power consumption requirement for the SDT. In some embodiments, the SS field dedicated for SDT may indicate additional DL radio resource for SDT, which may be used together with the DL radio resource indicated by the Type0 common SS field for SDT. In some embodiments, in a case where more than one monitoring occasion per slot is indicated by the message, before the step of transmitting, to the UE, one or more PDCCHs for SDT in the indicated DL radio resource, the method 600 may further comprise: determining one of the monitoring occasions per slot to be transmitted, and where the step of transmitting, to the UE, one or more PDCCHs for SDT in the indicated DL radio resource comprises: transmitting, to the UE, one or more PDCCHs for SDT in the determined monitoring occasion per slot. In some embodiments, the step of determining one of the monitoring occasions per slot to be monitored may comprise one of: determining the monitoring occasion per slot to be monitored according to a pre-agreed rule; and determining the monitoring occasion per slot to be monitored at least based on a corresponding CORESET configuration, a corresponding physical random access channel (PRACH) preamble configuration for SDT, a corresponding CG configuration for SDT, and/or a corresponding system frame number.

In some embodiments, the CORESET field may indicate DL radio resource corresponding to CORESET0. In some embodiments, the message may comprise a CORESET field dedicated for SDT. In some embodiments, the RRC release message may indicate a UE specific CORESET. In some embodiments, in a case where multiple CORESETs are configured at the UE, the method 600 may further comprise: transmitting, to the UE, a third message comprising at least one CORESET ID field identifying at least one of the multiple CORESETs to be used for SDT monitoring, wherein the step of transmitting, to the UE, one or more PDCCHs for SDT in the indicated DL radio resource may comprise: transmitting the one or more PDCCHs for SDT in the DL radio resource corresponding to the identified CORESET.

In some embodiments, the third message may be one of: a dedicated RRC message; a medium access control (MAC) protocol data unit (PDU); a Msg4 in a RACH procedure; a downlink control information (DCI) message. In some embodiments, the DCI message may be used for scheduling a downlink transmission for which the CORESET is known.

Figure 7:
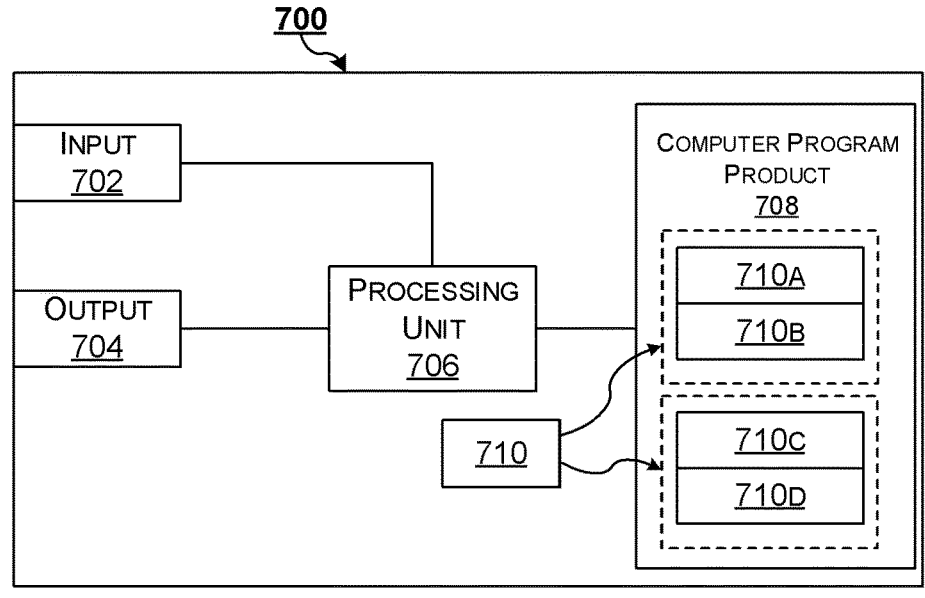
FIG. 7 schematically shows an embodiment of an arrangement which may be used in a UE or a network node according to an embodiment of the present disclosure.

FIG. 7 schematically shows an embodiment of an arrangement 700 which may be used in a user equipment (e.g., the UE 110) or a network node (e.g., the gNB 120) according to an embodiment of the present disclosure. Comprised in the arrangement 700 are a processing unit 706, e.g., with a Digital Signal Processor (DSP) or a Central Processing Unit (CPU). The processing unit 706 may be a single unit or a plurality of units to perform different actions of procedures described herein. The arrangement 700 may also comprise an input unit 702 for receiving signals from other entities, and an output unit 704 for providing signal(s) to other entities. The input unit 702 and the output unit 704 may be arranged as an integrated entity or as separate entities.

Furthermore, the arrangement 700 may comprise at least one computer program product 708 in the form of a non-volatile or volatile memory, e.g., an Electrically Erasable Programmable Read-Only Memory (EEPROM), a flash memory and/or a hard drive. The computer program product 708 comprises a computer program 710, which comprises code/computer readable instructions, which when executed by the processing unit 706 in the arrangement 700 causes the arrangement 700 and/or the UE/network node in which it is comprised to perform the actions, e.g., of the procedure described earlier in conjunction with FIG. 3 to FIG. 6 or any other variant.

The computer program 710 may be configured as a computer program code structured in computer program modules 710A and 710B. Hence, in an exemplifying embodiment when the arrangement 700 is used in a UE, the code in the computer program of the arrangement 700 includes: a module 710A for receiving, from a network node serving the UE, a message indicating the DL radio resource to be monitored by the UE for SDT; and a module 710B for monitoring one or more PDCCHs in the indicated DL radio resource for SDT in the non-connected state.

Further, the computer program 710 may be configured as a computer program code structured in computer program modules 710C and 710D. Hence, in an exemplifying embodiment when the arrangement 700 is used in a network node, the code in the computer program of the arrangement 700 includes: a module 710C for transmitting, to the UE, a message indicating the DL radio resource to be monitored by the UE for SDT; and a module 710D for transmitting, to the UE, one or more PDCCHs for SDT in the indicated DL radio resource.

The computer program modules could essentially perform the actions of the flow illustrated in FIG. 3 to FIG. 6, to emulate the UE or the network node. In other words, when the different computer program modules are executed in the processing unit 706, they may correspond to different modules in the UE or the network node.

Although the code means in the embodiments disclosed above in conjunction with FIG. 7 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

Figure 8:
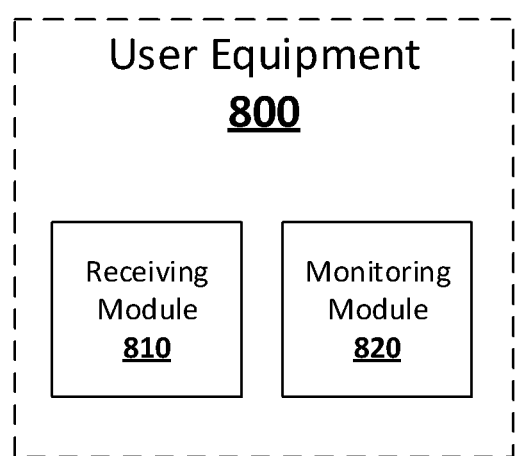
FIG. 8 is a block diagram of an exemplary UE according to an embodiment of the present disclosure.

Correspondingly to the method 500 as described above, an exemplary user equipment is provided. FIG. 8 is a block diagram of a UE 800 according to an embodiment of the present disclosure. The UE 800 may be, e.g., the UE 110 in some embodiments.

The UE 800 may be configured to perform the method 500 as described above in connection with FIG. 5. As shown in FIG. 8, the UE 800 may comprise a receiving module 810 for receiving, from a network node serving the UE, a message indicating the DL radio resource to be monitored by the UE 800 for SDT; and a monitoring module 820 for monitoring one or more PDCCHs in the indicated DL radio resource for SDT in the non-connected state.

The above modules 810 and/or 820 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 5. Further, the UE 800 may comprise one or more further modules, each of which may perform any of the steps of the method 500 described with reference to FIG. 5.

Figure 9:
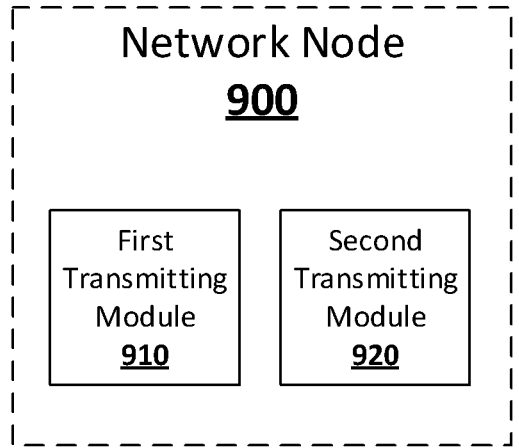
FIG. 9 is a block diagram of an exemplary network node according to an embodiment of the present disclosure.

Correspondingly to the method 600 as described above, a network node is provided. FIG. 9 is a block diagram of an exemplary network node 900 according to an embodiment of the present disclosure. The network node 900 may be, e.g., the gNB 120 in some embodiments.

The network node 900 may be configured to perform the method 600 as described above in connection with FIG. 6. As shown in FIG. 9, the network node 900 may comprise a first transmitting module 910 for transmitting, to the UE, a message indicating the DL radio resource to be monitored by the UE for SDT; and a second transmitting module 920 for transmitting, to the UE, one or more PDCCHs for SDT in the indicated DL radio resource.

The above modules 910 and/or 920 may be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 6. Further, the network node 900 may comprise one or more further modules, each of which may perform any of the steps of the method 600 described with reference to FIG. 6.

Figure 10:
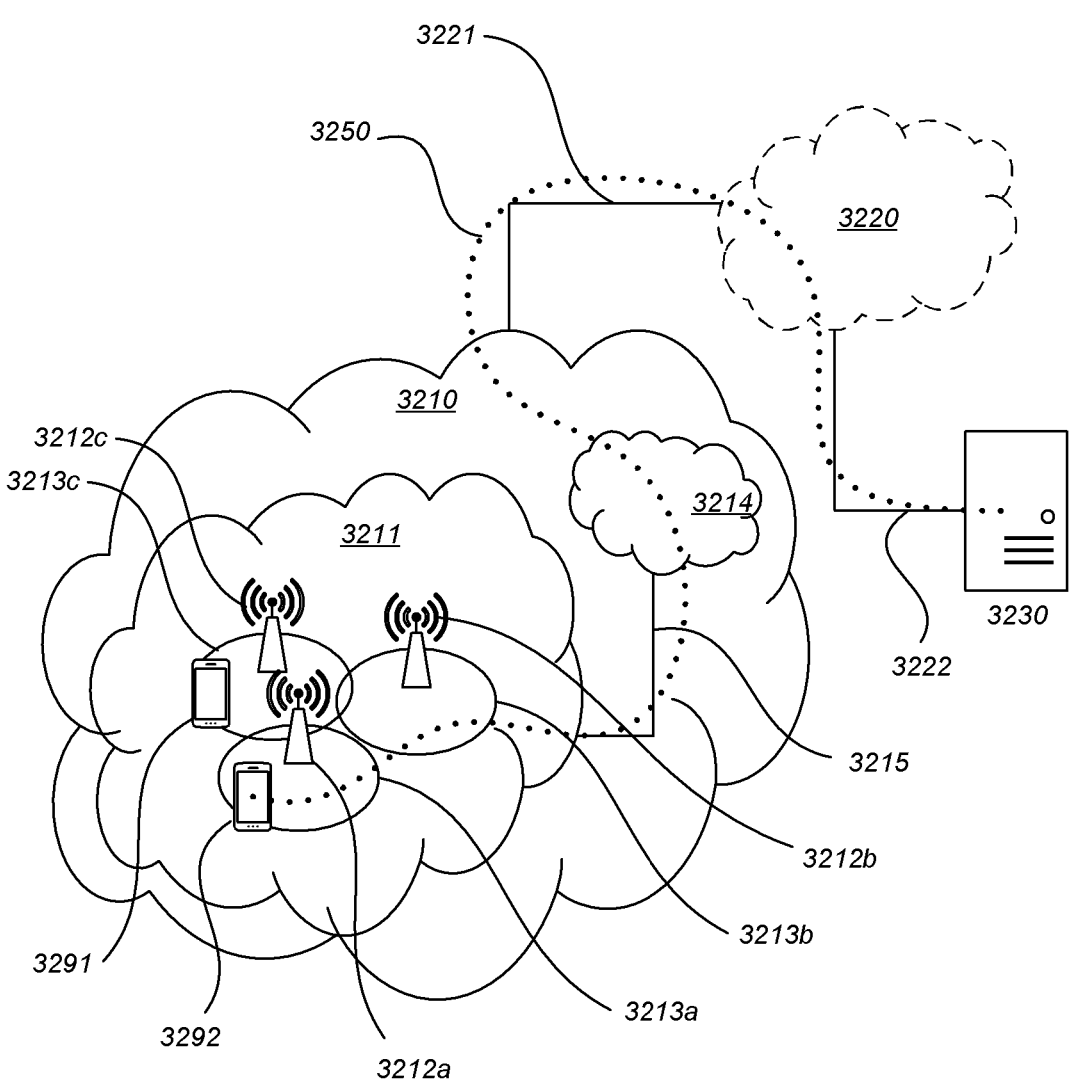
FIG. 10 schematically illustrates a telecommunication network connected via an intermediate network to a host computer according to an embodiment of the present disclosure.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
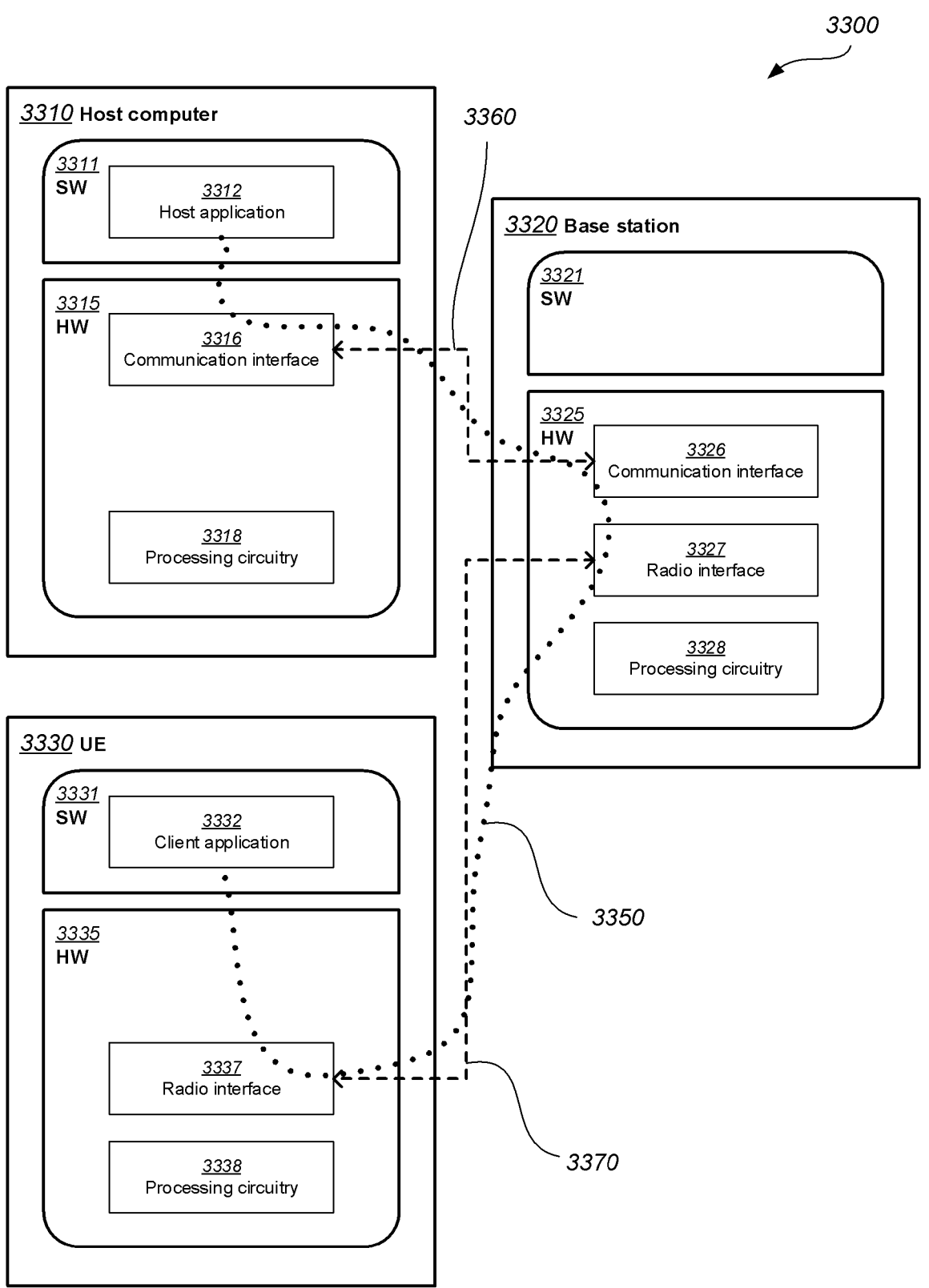
FIG. 11 is a generalized block diagram of a host computer communicating via a base station with a user equipment over a partially wireless connection according to an embodiment of the present disclosure.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the latency and power consumption and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
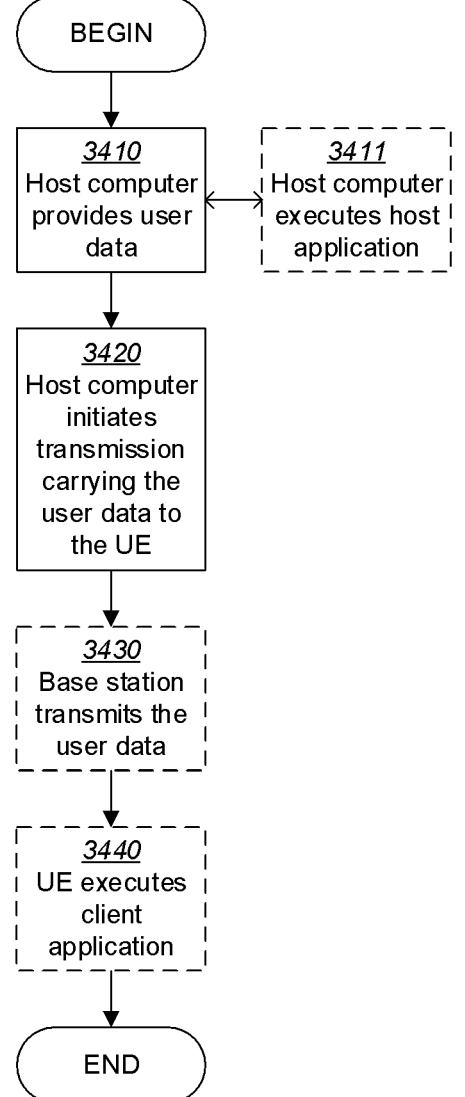

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
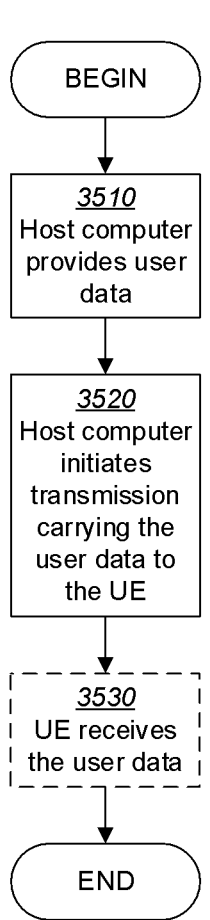

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

| Abbreviation | Explanation |
| --- | --- |
| BWP | Bandwidth Part |
| CG | Configured Grant |
| CORESET | Control Resource Set |
| CP | Cyclic Prefix |
| C-SS or CSS | Common Search Space |
| DCI | Downlink Control Information |
| ECP | Extended CP |
| FDM | Frequency-Division Multiplexing |
| MA | Multiple Access |
| NR | New radio |
| NW | Network |
| OFDM | Orthogonal Frequency Division Multiplexing |
| PUSCH | Physical Uplink Shared Channel |
| PDSCH | Physical Downlink Shared Channel |
| PXSCH | PUSCH or PDSCH |
| RACH | Random Access Channel |
| RMSI | Remaining minimum system information, also known as SIB1 |
| SCS | Subcarrier Spacing |
| SDT | Small Data Transmission |

-continued

| Abbreviation | Explanation |
| --- | --- |
| SIB1 | System information block type 1 |
| SRS | Sounding Reference Signal |
| SS | Search Space |
| SSB | SS/PBCH block |
| TDM | Time-Division Multiplexing |

What is claimed is:

1. A method at a user equipment (UE) for monitoring Physical Downlink Control Channel (PDCCH) in downlink (DL) radio resource for small data transmission (SDT) in a non-connected state, the method comprising:

receiving, from a network node serving the UE, a message indicating the DL radio resource to be monitored by the UE for SDT; and monitoring one or more PDCCHs in the indicated DL radio resource for SDT in the non-connected state, wherein the non-connected state is an RRC_INAC-TIVE state, and wherein the DL radio resource is indicated in the message by a control resource set (CORESET) field or a CORESET ID field.

2. The method of claim 1, wherein:

the message is a system information message or a UE specific Radio Resource Control (RRC) message;

the system information message is an RRC System Information Block 1 (SIB1) message or an RRC System Information (SI) message; and the DL radio resource is indicated in the message by a Type1 common SS field.

3. The method of claim 2, wherein the DL radio resource is indicated in the message by a Type3 common SS field.

4. The method of claim 2, wherein the DL radio resource is indicated in the UE specific RRC message by a UE specific SS field.

5. The method of claim 4, wherein after receiving, from a network node serving the UE, a message indicating the DL radio resource to be monitored by the UE for SDT and before monitoring one or more PDCCHs in the indicated DL radio resource for SDT in the non-connected state, the method further comprises transitioning from an RRC_CO-NNECTED state to the RRC_INACTIVE state.

6. The method of claim 2, wherein the UE specific RRC message is an RRC release message that causes the UE to transition into the RRC_INACTIVE state.

7. The method of claim 6, wherein the RRC release message indicates a UE specific CORESET.

8. The method of claim 2, wherein the message comprises an SS field dedicated for SDT, the SS field dedicated for SDT indicating additional DL radio resource for SDT, which is used together with the DL radio resource indicated by a Type0 common SS field for SDT.

9. The method of claim 1, wherein monitoring one or more PDCCHs in the indicated DL radio resource for SDT in the non-connected state comprises one or more of:

monitoring, in the indicated DL radio resource, a PDCCH which schedules a Physical Downlink Share Channel (PDSCH) for a random access response (RAR) in a 4-step random-access-channel (RACH)-based SDT;

monitoring, in the indicated DL radio resource, a PDCCH which schedules a PDSCH for a MsgB in a 2-step RACH-based SDT;

monitoring, in the indicated DL radio resource, a PDCCH with a cyclic redundancy check (CRC) scrambled by a cell-radio network temporary identifier (C-RNTI) assigned to the UE; and monitoring, in the indicated DL radio resource, a PDDCH which schedules a PDSCH for a configured-grant (CG)-based SDT.

10. The method of claim 2, wherein the DL radio resource is indicated in the message by a Type0 common SS field, a Type0A common SS field, and/or a Type2 common SS field.

11. The method of claim 1, wherein when multiple SSs are configured at the UE, the method further comprises:

determining an SS from the multiple SSs according to a predetermined rule; and wherein monitoring one or more PDCCHs in the indicated DL radio resource for SDT in the non-connected state comprises monitoring one or more PDCCHs in the DL radio resource corresponding to the determined SS.

12. The method of claim 1, wherein when multiple SSs are configured, the method further comprises:

receiving a second message comprising at least one SS ID field identifying at least one of the multiple SSs to be used for SDT monitoring;

wherein monitoring one or more PDCCHs in the indicated DL radio resource for SDT in the non-connected state comprises monitoring one or more PDCCHs in the DL radio resource corresponding to the identified SS;

wherein the second message is one of:

a dedicated RRC message;

a medium access control (MAC) protocol data unit (PDU);

a Msg4 in a RACH procedure; and a downlink control information (DCI) message; and wherein the DCI message is used for scheduling a down-link transmission for which the SS is known.

13. The method of claim 12, wherein a number of DL radio resources assigned for SDT in a period of time is determined based at least on a latency requirement and/or power consumption requirement for the SDT.

14. The method of claim 1, wherein when more than one monitoring occasion per slot is indicated by the message, before monitoring one or more PDDCHs in the indicated DL radio resource for SDT in the non-connected state, the method further comprises:

determining one of the monitoring occasions per slot to be monitored; and wherein monitoring one or more PDCCHs in the indicated DL radio resource for SDT in the non-connected state comprises monitoring one or more PDCCHs in the determined monitoring occasion for SDT.

15. The method of claim 14, wherein determining one of the monitoring occasions per slot to be monitored comprises one of:

receiving, from the network node, an RRC message indicating the monitoring occasion per slot to be moni-tored;

determining the monitoring occasion per slot to be moni-tored according to a pre-determined rule; and determining the monitoring occasion per slot to be moni-tored based at least on a corresponding CORESET configuration, a corresponding physical random access channel (PRACH) preamble configuration for SDT, a corresponding CG configuration for SDT, and/or a corresponding system frame number.

16. The method of claim 1, wherein the CORESET field indicates DL radio resource corresponding to CORESET0.

17. The method of claim 1, wherein the CORESET field is dedicated for SDT.

18. The method of claim 1, wherein when multiple CORESETs are configured at the UE, the method further comprising:

receiving, from the network node, a third message comprising at least one CORESET ID field identifying at least one of the multiple CORESETs to be used for SDT monitoring;

wherein monitoring one or more PDCCHs in the indicated DL radio resource for SDT in the non-connected state comprises monitoring one or more PDCCHs in the DL radio resource corresponding to the identified CORESET;

wherein the third message is one of:

a dedicated RRC message;

a medium access control (MAC) protocol data unit (PDU);

a Msg4 in a RACH procedure; and a downlink control information (DCI) message; and wherein the DCI message is used for scheduling a downlink transmission for which the CORESET is known.

19. A user equipment (UE) for monitoring Physical Downlink Control Channel (PDCCH) in downlink (DL)

radio resource for small data transmission (SDT) in a non-connected state, the UE comprising:

a processor; and a memory storing instructions which, when executed by the processor, cause the processor to:

receive from a network node serving the UE, a message indicating a DL radio resource to be monitored by the UE for SDT; and monitor one or more PDCCHs in the indicated DL radio resource for SDT in the non-connected state, wherein the non-connected state is an RRC_INACTIVE state, and wherein the DL radio resource is indicated in the message by a control resource set (CORESET) field or a CORESET ID field.

20. A method at a network node for configuring a user equipment (UE) with downlink (DL) radio resource for Physical Downlink Control Channel (PDCCH) for small data transmission (SDT) in a non-connected state, the method comprising:

transmitting, to the UE, a message indicating the DL radio resource to be monitored by the UE for SDT; and transmitting, to the UE, one or more PDCCHs for SDT in the indicated DL radio resource, wherein the non-connected state is an RRC_INACTIVE state, and wherein the DL radio resource is indicated in the message by a control resource set (CORESET) field or a CORESET ID field.

* * * * *